US007839822B2

(12) United States Patent
Yang et al.

(10) Patent No.: US 7,839,822 B2
(45) Date of Patent: Nov. 23, 2010

(54) METHOD AND APPARATUS FOR WIRELESS RESOURCE ALLOCATION

(75) Inventors: Yunsong Yang, San Diego, CA (US); Anthony C. K. Soong, Plano, TX (US); Jianmin Lu, San Diego, CA (US); Patrick Hosein, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 941 days.

(21) Appl. No.: 11/679,060

(22) Filed: Feb. 26, 2007

(65) Prior Publication Data

US 2007/0201398 A1    Aug. 30, 2007

Related U.S. Application Data

(60) Provisional application No. 60/776,603, filed on Feb. 24, 2006.

(51) Int. Cl.
*H04Q 7/00* (2006.01)
(52) U.S. Cl. ........................................ 370/329; 455/450
(58) Field of Classification Search ........................ None
See application file for complete search history.

(56) References Cited

U.S. PATENT DOCUMENTS

| | | | |
|---|---|---|---|
| 6,571,099 B1 | 5/2003 | Kim et al. | |
| 6,980,811 B2 * | 12/2005 | Harris | 455/452.1 |
| 2002/0152342 A1 | 10/2002 | Das et al. | |
| 2003/0017830 A1 | 1/2003 | Kayama et al. | |
| 2003/0067935 A1 | 4/2003 | Hosein | |
| 2004/0258026 A1 | 12/2004 | Lau | |
| 2005/0111488 A1 | 5/2005 | Subramanian et al. | |
| 2005/0141454 A1 | 6/2005 | Jain et al. | |
| 2005/0180349 A1 | 8/2005 | Alamouti et al. | |
| 2005/0197129 A1 | 9/2005 | Cho et al. | |
| 2005/0265434 A1 | 12/2005 | Watanabe | |
| 2006/0003794 A1 | 1/2006 | Chung et al. | |
| 2006/0094363 A1 | 5/2006 | Kang et al. | |
| 2006/0256887 A1 | 11/2006 | Kwon et al. | |
| 2007/0004437 A1 | 1/2007 | Harada et al. | |
| 2007/0070905 A1 | 3/2007 | Oliver et al. | |
| 2007/0206623 A1 | 9/2007 | Tiedemann, Jr. et al. | |

(Continued)

OTHER PUBLICATIONS

Unknown, E-Urta Resource Allocation Design for Downlink, ZTE, 3GPP TSG-RAN WG1 #43, Nov. 7-11, 2005, Seoul Korea.

(Continued)

*Primary Examiner*—Lester Kincaid
*Assistant Examiner*—Phuoc Doan
(74) *Attorney, Agent, or Firm*—Slater & Matsil, L.L.P.

(57) ABSTRACT

Techniques are provided to assign radio resources with one of two or more types of assignments on a frame-by-frame basis. The first type of assignment uses subcarriers that are contiguous in both time and frequency, and the second type of assignment uses subcarriers that are disjoint and equally-spaced in frequency. The types of resource assignments can be multiplexed in a frame by dividing the frame into two zones, each zone of a different type. The demarcation between the first and second zones is implicitly indicated by the assignment messages for the mobile stations. Based on the loading conditions, the base station selects one of two demarcation strategies to use and communicates the selection implicitly by using one assignment message for a mobile station.

24 Claims, 11 Drawing Sheets

U.S. PATENT DOCUMENTS

2007/0263735 A1    11/2007    Tong et al.
2009/0080575 A1    3/2009     Chuang et al.
2009/0196164 A1*   8/2009     Vook et al. .................. 370/208

OTHER PUBLICATIONS

Unknown, Downlink Multiplexing for Eutra, Samsung, 3GPP TSG-RAN WG1 Meeting #42bis, Oct. 10-14, 2005, San Diego California, USA.

Kitroser, I., et al., "OFDMA MAC-PHY Section Details," IEEE 802.16 Broadband Wireless Access Working Group, Aug. 29, 2001, pp. 0-19, IEEE.

"Updated Lucent-Nortel-Samsung proposal for Air Interface Evolution Phase 2," 3GPP2 TSG-C WG3, C30-20060327-018, Mar. 30, 2006, pp. 1, 29-34, 3GPP2.

Song, G., et al., "Adaptive Subcarrier and Power Allocation in OFDM Based on Maximizing Utility," The 57th IEEE Semiannual Vehicular Technology Conference, Apr. 22-25, 2003, 5 pages.

* cited by examiner

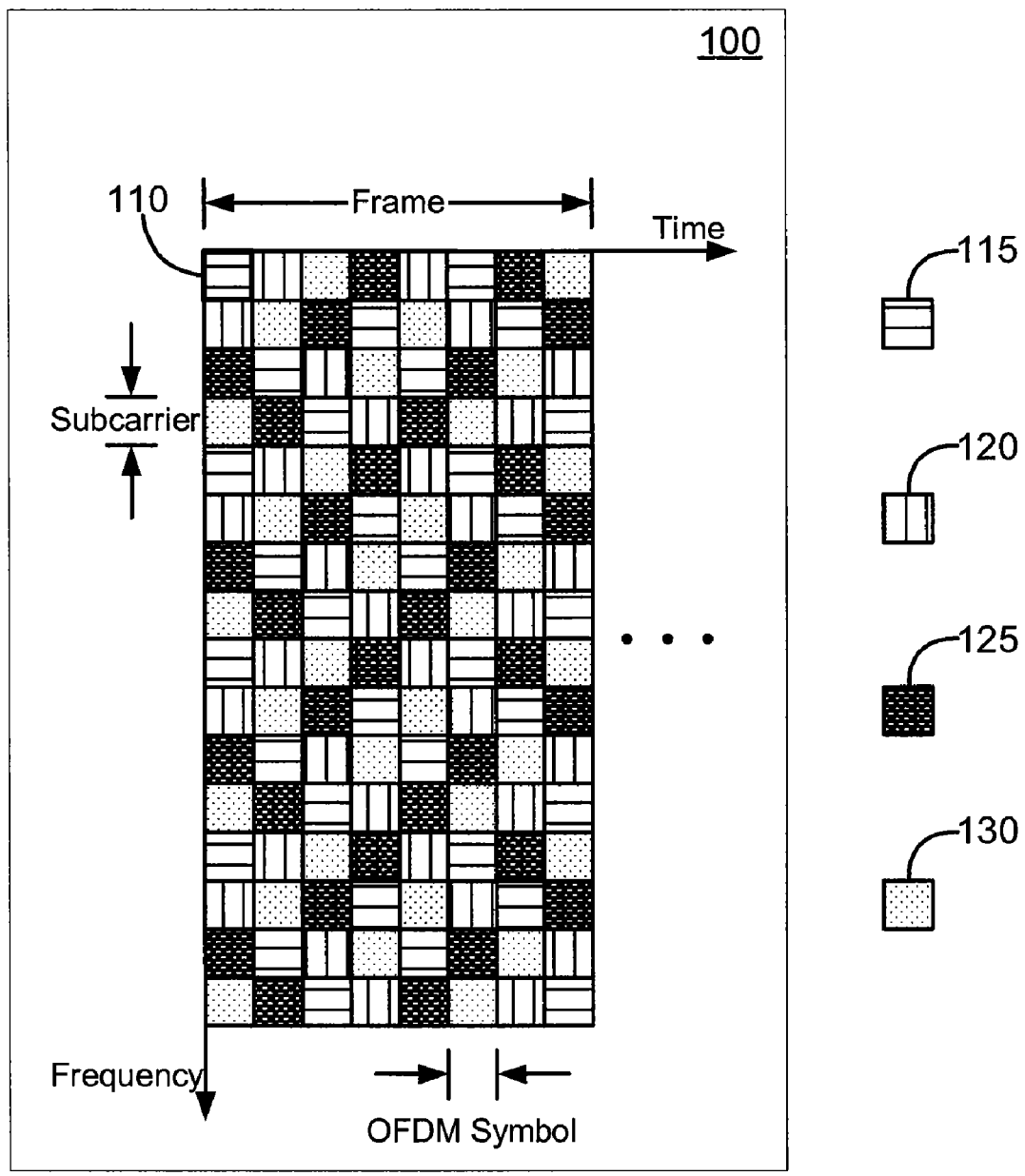
FIG. 1A *(Prior Art)*

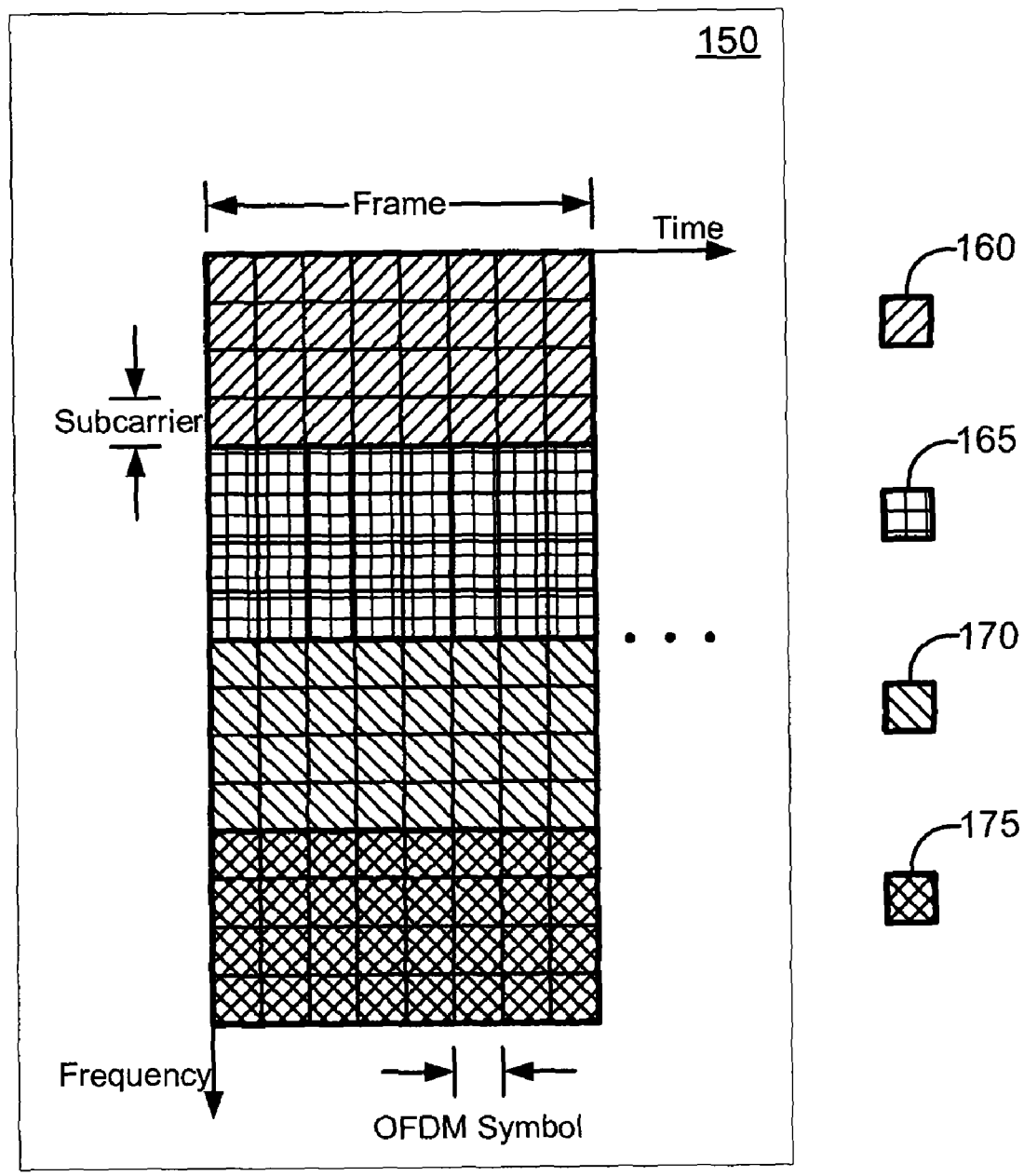
FIG. 1B *(Prior Art)*

METHOD AND APPARATUS FOR WIRELESS RESOURCE ALLOCATION

PRIORITY CLAIM

This application claims the priority of U.S. Provisional Application No. 60/776,603, filed Feb. 24, 2006.

TECHNICAL FIELD OF THE INVENTION

The present invention generally relates to orthogonal frequency division multiplexing (OFDM) and orthogonal frequency division multiple access (OFDMA) communication systems. More particularly, the present invention relates to novel and improved methods of allocating radio resources for transmission in a wireless communication system.

BACKGROUND

Demand for wideband wireless high-speed data services are on the rise. In a wideband wireless communications system, the signal tends to suffer from the frequency selective fading due to multi-path. Orthogonal Frequency Division Multiplexing (OFDM) systems have been proposed to combat the frequency selective fading by dividing the total bandwidth into a plurality of subcarriers where the bandwidth on each of multiple subcarriers is sufficiently narrow to enable the data modulation symbols carried by that subcarrier to experience relatively flat fading.

Orthogonal Frequency Division Multiple Access (OFDMA) systems use the OFDM modulation technique to multiplex the traffic data of a plurality of mobile stations (MS) in frequency and time. FIG. 1A illustrates that in an OFDMA system, the available radio resource over one time interval (frame) for traffic data, which may or may not include the radio resource occupied by the guard band, the control channels, the pilot or other overhead channels, is divided in time and frequency. The smallest bin 110 is one subcarrier in frequency over one OFDM symbol period in time. The forward shared scheduling channels (F-SSCH) transmit assignment messages that communicate which mobile station (MS) is assigned with which bin or group of bins for data transmission. In order to reduce the overhead of the F-SSCH, a plurality of subcarriers over a period of one frame, consisting of a plurality of OFDM symbols in time, are assigned to a mobile station for data transmission.

In a cellular network or an ad hoc network, some mobile stations may be moving at fast rate of speed with respect to the base station, while other mobile stations are more stationary when they transmit or receive data. Some mobile stations experience severe multi-path while others have a near line-of-sight channel with the base station antenna. Therefore, two types of assignment strategies have been proposed for an OFDMA-based wireless communications system.

Referring to FIG. 1A as an illustrative example, the total radio resource 100 over one frame is divided up for four different assigned mobile stations, indicated by different patterns 115, 120, 125, 130, respectively. The radio resource assigned for a particular mobile station in FIG. 1A is disjoint in frequency with equal spacing between the adjacent assigned subcarriers and disjoint in time with frequency offset hopping from OFDM symbol to OFDM symbol. This type of assignment is called distributed assignment. In general, the radio resource assigned to a user (mobile station) via a distributed assignment is disjointed in either time or frequency or both.

Referring to FIG. 1B as another illustrative example, the total radio resource 150 is divided up for four different assigned mobile stations, indicated by shade patterns 160, 165, 170, 175, respectively. The radio resource assigned for a particular mobile station in FIG. 1B is contiguous in both frequency and time. This type of assignment is called localized assignment.

In order to optimize the utilization of the radio resource in an OFDMA-based wideband wireless communications system, a method is needed to multiplex the data packets of multiple mobile stations with different channel fading conditions using minimal control overhead.

SUMMARY OF THE INVENTION

It is an objective of the present invention to provide a radio resource assignment method and apparatus that gives the base station the flexibility to divide and assign the radio resource in time only, in frequency only, or in both time and frequency to each of a plurality of mobile stations on a dynamic frame-by-frame basis in a wireless communication system using OFDMA.

It is another objective of the present invention to provide a method and apparatus for the base station to communicate the assignments to the mobile stations reliably, while minimizing the signaling overhead.

It is yet another objective of the present invention to provide a method and apparatus for the mobile station to detect the assignment from the base station reliably.

In accordance with one aspect of the present invention, there is a first type of assignment that can be used to assign the radio resource of a frame in frequency only. This first type of assignment is provided by dividing the total radio resource of a frame into frequency subcarriers such that each possible assignment unit contains subcarriers that are contiguous in both time and frequency. A second type of assignment can be used to assign the radio resource of a frame in time only or in both time and frequency. This second type of assignment is provided by dividing the total radio resource of a frame in time only such that the smallest assignment unit is one OFDM symbol in time and then further dividing the radio resource into frequency subcarriers such that the assignment units are a group of disjoint subcarriers (not contiguous in frequency or time).

In accordance with another aspect of the present invention, a method is provided to multiplex the first and second types of assignments in the same frame by dividing the frame into a first zone and a second zone, wherein all of the first type of assignments are assigned to be in the first zone and all of the second type of assignments are assigned to be in the second zone. The demarcation between the first zone and the second zone is implicitly communicated via the signaling for the individual assignments. Based on the traffic loading conditions of the first and second types of assignments in a frame, the base station can choose one of two demarcation strategies to use, on a dynamic frame-by-frame basis. In the first demarcation strategy, the demarcation between the first zone and second zone is implicitly indicated by the last assignment of the second type of assignment (the distributed, non-contiguous assignment). In the second demarcation strategy, the demarcation between the first and second zones is implicitly indicated through all of the first type of assignments. Which demarcation strategy is being used is implicitly indicated through the last assignment of the second type of assignment.

In accordance with yet another aspect of the present invention, methods are provided to identify the last assignment of the second type of assignment. In one embodiment, the last assignment of the second type of assignment is identified by the position of the resource assigned by the last assignment of the second type of assignment in a resource denotation table. In another embodiment, the last assignment of the second type of assignment, if it exists in a frame, is transmitted only on a first forward shared scheduling channel (F-SSCH) among multiple such channels. An assignment that is not the last assignment of the second type of assignment can be transmitted on the first F-SSCH if and only if the last assignment of the second type of assignment does not exist in the same frame. Therefore, the last assignment of the second type of assignment can be identified by the 'Assignment Type' field in the assignment carried by the first F-SSCH. The first F-SSCH can be distinguished from the other F-SSCHs by using a special orthogonal code, scrambling code, frequency subband, sub-field within a long field of assignment message, time, or time-frequency bin, which is specified by the individual base station. The F-SSCH is communicated to all mobile stations by signaling messages. In a system where the forward link and reverse link share the same F-SSCH pool, the first F-SSCH for the forward link transmission can be a different F-SSCH than the first F-SSCH for the reverse link transmission.

In yet another embodiment, the last assignment of the second type of assignment can be identified by using a second scrambling method on the F-SSCH that carries the last assignment of the second type of assignment, while the first scrambling method is used to scramble any F-SSCH that does not carry the last assignment of the second type of assignment. The first and second scrambling methods can differ in the PN register structure or in the scrambling seed, for example, by adding a field of 'Scrambling Type' in the scrambling seed.

In accordance with yet another aspect of the present invention, a method is provided to confirm to the mobile stations that are scheduled with the second type of assignment that there is no first type of assignment in the same frame. This method includes transmitting the last assignment message of the second type of assignment on the first F-SSCH and scrambling it with the first scrambling method (if there is at least one assignment of the first type of assignment in the same frame) or scrambling it with the second scrambling method (if there is no assignment of the first type of assignment in the same frame).

In accordance with yet another aspect of the present invention, a method and apparatus is provided for indicating the assignment type implicitly by the size of the resource assigned, eliminating the need for an 'Assignment Type' field in the assignment message and minimizing the signaling overhead.

BRIEF DESCRIPTION OF THE DRAWINGS

FIG. 1 illustrates the radio resource in an OFDMA system and two conventional resource assignment methods.

DETAILED DESCRIPTION

Figure 2A:
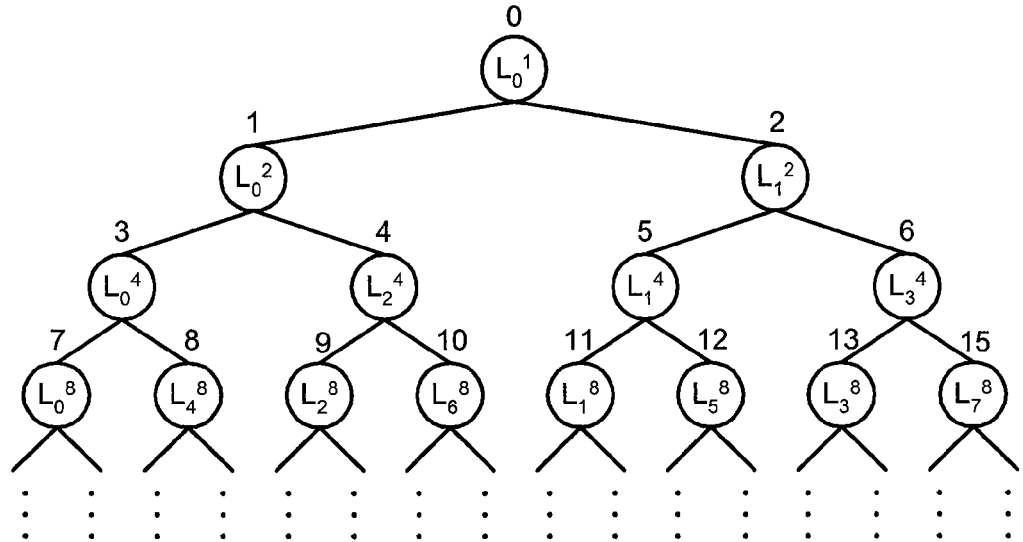
FIG. 2 illustrates two alternative tree structures of combining of smaller resource assignment units into a bigger resource assignment unit and the denotation of the tree nodes.

Table 1 below provides an exemplary denotation of the radio resources assigned with a localized assignment method (the first type of assignment), according to one embodiment of the present invention. The total bandwidth of the exemplary system is 5 MHz with a sampling rate of 4.9152 Msps (million samples per second). The fast Fourier transformation (FFT) size is 512, which is also the total number of subcarriers (divisions of the total frequency bandwidth). The 512 subcarriers are divided into a minimum of 32 contiguous localized assignment units. Each localized assignment unit consists of 16 contiguous subcarriers to transmit a plurality of contiguous OFDM symbols within a frame.

In a system where the control channels, such as F-SSCH, that carry the assignment messages for each frame are frequency division multiplexed (FDM) with the data channels, some localized assignment units are used for the control channels and thus, cannot be used for the data channels. In a system where the control channels are time division multiplexed (TDM) with the data channels, which is the case illustrated in Table 1, some OFDM symbols in a frame (for example, OFDM Symbol 0) is used for the control channels, while OFDM Symbols 1 to 7 are used for the data channels. In addition, the solid-shaded area in Table 1 may be used for Guard Band and therefore, is not available for data. Guard Band in the example given in Table 1 corresponds to subcarriers 224 to 287. Subcarrier 0 is the Direct Current (DC) tone of the baseband signal.

TABLE 1

| Total Bandwidth (e.g. 5 MHz Bandwhidth with FFT Size of 512) | | | | | Data Frame OFDM Symbols 1~7 | Subcarrier Index |
|---|---|---|---|---|---|---|
| | | | | $L_0^{16}$ | $L_0^{32}$ | 0~15 |
| | | | $L_0^8$ | | $L_{16}^{32}$ | 16~31 |
| | | | | $L_8^{16}$ | $L_8^{32}$ | 32~47 |
| | | $L_0^4$ | | | $L_{24}^{32}$ | 48~63 |
| | | | | $L_4^{16}$ | $L_4^{32}$ | 64~79 |
| | | | $L_4^8$ | | $L_{20}^{32}$ | 80~95 |
| | | | | $L_{12}^{16}$ | $L_{12}^{32}$ | 96~111 |
| | $L_0^2$ | | | | $L_{28}^{32}$ | 112~127 |
| | | | | $L_2^{16}$ | $L_2^{32}$ | 128~143 |
| | | | $L_2^8$ | | $L_{18}^{32}$ | 144~159 |
| | | | | $L_{10}^{16}$ | $L_{10}^{32}$ | 160~175 |
| | | $L_2^4$ | | | $L_{26}^{32}$ | 176~191 |
| | | | | $L_6^{16}$ | $L_6^{32}$ | 192~207 |
| | | | $L_6^8$ | | $L_{22}^{32}$ | 208~223 |
| | | | | $L_{14}^{16}$ | | 224~239 |
| | $L_0^1$ | | | | | 240~255 |
| | | | | | | 256~271 |
| | | | | $L_{15}^{16}$ | | 272~287 |
| | | | | | | Guard Band |
| | | | $L_7^8$ | | | |
| | | | | $L_7^{16}$ | $L_{23}^{32}$ | 288~303 |
| | | $L_3^4$ | | | $L_7^{32}$ | 304~319 |
| | | | | $L_{11}^{16}$ | $L_{27}^{32}$ | 320~335 |
| | | | $L_3^8$ | | $L_{11}^{32}$ | 336~351 |
| | | | | $L_3^{16}$ | $L_{19}^{32}$ | 352~367 |
| | $L_1^2$ | | | | $L_3^{32}$ | 368~383 |
| | | | | $L_{13}^{16}$ | $L_{29}^{32}$ | 384~399 |
| | | | $L_5^8$ | | $L_{13}^{32}$ | 400~415 |
| | | | | $L_5^{16}$ | $L_{21}^{32}$ | 416~431 |
| | | $L_1^4$ | | | $L_5^{32}$ | 432~447 |
| | | | | $L_9^{16}$ | $L_{25}^{32}$ | 448~463 |
| | | | $L_1^8$ | | $L_9^{32}$ | 464~479 |
| | | | | $L_1^{16}$ | $L_{17}^{32}$ | 480~495 |
| | | | | | $L_1^{32}$ | 496~511 |

As shown in Table 1 above, a localized assignment unit (the first assignment type) is denoted as $L_k^N$, representing the kth divided assignment unit if the total available resource is divided into N equal-sized localized assignment units. As shown in Table 1, two smaller localized assignment units with the same size and certain relationship in their indices can be combined into a larger localized assignment unit.

FIG. 2A further illustrates, with an exemplary tree structure, how two smaller localized assignment units with the same size and certain relationship in their indices can be combined into a larger localized assignment unit. Each circle, called a tree node, in FIG. 2A represents a localized assignment unit. Each tree node can be represented by a combination of N and k as defined above. To reduce the signaling overhead, the representation of a tree node can be simplified as one number, called a Node Index (NodeID), which is above each circle as shown in FIG. 2A. The generalized rule of combining two smaller localized assignment units into a larger localized assignment unit is as follows:

$$L_k^N = L_k^{2N} + L_{k+N}^{2N} \qquad (1)$$

Table 2 below shows an exemplary denotation of the radio resources with the distributed assignment (the second assignment type) for the same 5 MHz system, according to one embodiment of the present invention. In the example shown in Table 2, one frame consists of 8 OFDM symbols and each OFDM symbol is divided in frequency into 4 minimum distributed assignment units. Each minimum distributed assignment unit consists of 128 disjoint and evenly spaced subcarriers. In a system where the control channels are frequency division multiplexed with the data channels, some subcarriers are assigned for the control channels and cannot be used for the data channels. In a system where the control channels are time division multiplexed with the data channels, some OFDM symbols in a frame (for example, OFDM Symbol 0) as indicated by the solid-shaded area in Table 2, is used for the control channels, while OFDM Symbols 1 to 7 are used for the data channels. In addition, the grid-shaded area in Table 2 may be used as Guard Band and therefore, not available for the data channels. The Guard Band in the example given in Table 2 corresponds to subcarriers 224 to 287. Subcarrier 0 is the Direct Current (DC) tone of the baseband signal.

TABLE 2

| | | | | Data Frame | | | | |
|---|---|---|---|---|---|---|---|---|
| OFDM Symbol 0 | OFDM Symbol 1 | OFDM Symbol 2 | OFDM Symbol 3 | OFDM Symbol 4 | OFDM Symbol 5 | OFDM Symbol 6 | OFDM Symbol 7 | Subcarrier Index |
| | | | $D_0^1$ | | | | | |
| | $D_1^2$ | | | | $D_0^2$ | | | |
| $D_3^4$ | | $D_1^4$ | | $D_2^4$ | | $D_0^4$ | | |
| $D_7^8$ | $D_3^8$ | $D_5^8$ | $D_1^8$ | $D_6^8$ | $D_2^8$ | $D_4^8$ | $D_0^8$ | |
| $D_7^{16}/D_7^{32}$ | $D_3^{16}/D_3^{32}$ | $D_5^{16}/D_5^{32}$ | $D_1^{16}/D_1^{32}$ | $D_6^{16}/D_6^{32}$ | $D_2^{16}/D_2^{32}$ | $D_4^{16}/D_4^{32}$ | $D_0^{16}/D_0^{32}$ | 0 |
| $D_{15}^{16}/D_{15}^{32}$ | $D_{11}^{16}/D_{11}^{32}$ | $D_{13}^{16}/D_{13}^{32}$ | $D_9^{16}/D_9^{32}$ | $D_{14}^{16}/D_{14}^{32}$ | $D_{10}^{16}/D_{10}^{32}$ | $D_{12}^{16}/D_{12}^{32}$ | $D_8^{16}/D_8^{32}$ | 1 |
| $D_7^{16}/D_{23}^{32}$ | $D_3^{16}/D_{19}^{32}$ | $D_5^{16}/D_{21}^{32}$ | $D_1^{16}/D_{17}^{32}$ | $D_6^{16}/D_{22}^{32}$ | $D_2^{16}/D_{18}^{32}$ | $D_4^{16}/D_{20}^{32}$ | $D_0^{16}/D_{16}^{32}$ | 2 |
| $D_{15}^{16}/D_{31}^{32}$ | $D_{11}^{16}/D_{27}^{32}$ | $D_{13}^{16}/D_{29}^{32}$ | $D_9^{16}/D_{25}^{32}$ | $D_{14}^{16}/D_{30}^{32}$ | $D_{10}^{16}/D_{26}^{32}$ | $D_{12}^{16}/D_{28}^{32}$ | $D_8^{16}/D_{24}^{32}$ | 3 |
| $D_7^{16}/D_7^{32}$ | $D_3^{16}/D_3^{32}$ | $D_5^{16}/D_5^{32}$ | $D_1^{16}/D_1^{32}$ | $D_6^{16}/D_6^{32}$ | $D_2^{16}/D_2^{32}$ | $D_4^{16}/D_4^{32}$ | $D_0^{16}/D_0^{32}$ | 4 |
| $D_{15}^{16}/D_{15}^{32}$ | $D_{11}^{16}/D_{11}^{32}$ | $D_{13}^{16}/D_{13}^{32}$ | $D_9^{16}/D_9^{32}$ | $D_{14}^{16}/D_{14}^{32}$ | $D_{10}^{16}/D_{10}^{32}$ | $D_{12}^{16}/D_{12}^{32}$ | $D_8^{16}/D_8^{32}$ | 5 |
| $D_7^{16}/D_{23}^{32}$ | $D_3^{16}/D_{19}^{32}$ | $D_5^{16}/D_{21}^{32}$ | $D_1^{16}/D_{17}^{32}$ | $D_6^{16}/D_{22}^{32}$ | $D_2^{16}/D_{18}^{32}$ | $D_4^{16}/D_{20}^{32}$ | $D_0^{16}/D_{16}^{32}$ | 6 |
| ⋮ | ⋮ | ⋮ | ⋮ | ⋮ | ⋮ | ⋮ | ⋮ | ⋮ |
| $D_{15}^{16}/D_{31}^{32}$ | $D_{11}^{16}/D_{27}^{32}$ | $D_{13}^{16}/D_{29}^{32}$ | $D_9^{16}/D_{25}^{32}$ | $D_{14}^{16}/D_{30}^{32}$ | $D_{10}^{16}/D_{26}^{32}$ | $D_{12}^{16}/D_{28}^{32}$ | $D_8^{16}/D_{24}^{32}$ | 223 |
| ⋮ | ⋮ | ⋮ | ⋮ | ⋮ | ⋮ | ⋮ | ⋮ | 224 ... 287 |
| $D_7^{16}/D_7^{32}$ | $D_3^{16}/D_3^{32}$ | $D_5^{16}/D_5^{32}$ | $D_1^{16}/D_1^{32}$ | $D_6^{16}/D_6^{32}$ | $D_2^{16}/D_2^{32}$ | $D_4^{16}/D_4^{32}$ | $D_0^{16}/D_0^{32}$ | 288 |
| ⋮ | ⋮ | ⋮ | ⋮ | ⋮ | ⋮ | ⋮ | ⋮ | ⋮ |
| $D_{15}^{16}/D_{15}^{32}$ | $D_{11}^{16}/D_{11}^{32}$ | $D_{13}^{16}/D_{13}^{32}$ | $D_9^{16}/D_9^{32}$ | $D_{14}^{16}/D_{14}^{32}$ | $D_{10}^{16}/D_{10}^{32}$ | $D_{12}^{16}/D_{12}^{32}$ | $D_8^{16}/D_8^{32}$ | 505 |
| $D_7^{16}/D_{23}^{32}$ | $D_3^{16}/D_{19}^{32}$ | $D_5^{16}/D_{21}^{32}$ | $D_1^{16}/D_{17}^{32}$ | $D_6^{16}/D_{22}^{32}$ | $D_2^{16}/D_{18}^{32}$ | $D_4^{16}/D_{20}^{32}$ | $D_0^{16}/D_{16}^{32}$ | 506 |
| $D_{15}^{16}/D_{31}^{32}$ | $D_{11}^{16}/D_{27}^{32}$ | $D_{13}^{16}/D_{29}^{32}$ | $D_9^{16}/D_{25}^{32}$ | $D_{14}^{16}/D_{30}^{32}$ | $D_{10}^{16}/D_{26}^{32}$ | $D_{12}^{16}/D_{28}^{32}$ | $D_8^{16}/D_{24}^{32}$ | 507 |
| $D_7^{16}/D_7^{32}$ | $D_3^{16}/D_3^{32}$ | $D_5^{16}/D_5^{32}$ | $D_1^{16}/D_1^{32}$ | $D_6^{16}/D_6^{32}$ | $D_2^{16}/D_2^{32}$ | $D_4^{16}/D_4^{32}$ | $D_0^{16}/D_0^{32}$ | 508 |
| $D_{15}^{16}/D_{15}^{32}$ | $D_{11}^{16}/D_{11}^{32}$ | $D_{13}^{16}/D_{13}^{32}$ | $D_9^{16}/D_9^{32}$ | $D_{14}^{16}/D_{14}^{32}$ | $D_{10}^{16}/D_{10}^{32}$ | $D_{12}^{16}/D_{12}^{32}$ | $D_8^{16}/D_8^{32}$ | 509 |
| $D_7^{16}/D_{23}^{32}$ | $D_3^{16}/D_{19}^{32}$ | $D_5^{16}/D_{21}^{32}$ | $D_1^{16}/D_{17}^{32}$ | $D_6^{16}/D_{22}^{32}$ | $D_2^{16}/D_{18}^{32}$ | $D_4^{16}/D_{20}^{32}$ | $D_0^{16}/D_{16}^{32}$ | 510 |
| $D_{15}^{16}/D_{31}^{32}$ | $D_{11}^{16}/D_{27}^{32}$ | $D_{13}^{16}/D_{29}^{32}$ | $D_9^{16}/D_{25}^{32}$ | $D_{14}^{16}/D_{30}^{32}$ | $D_{10}^{16}/D_{26}^{32}$ | $D_{12}^{16}/D_{28}^{32}$ | $D_8^{16}/D_{24}^{32}$ | 511 |

As shown in Table 2 above, a distributed assignment unit is denoted as $D_k^N$, representing the kth divided assignment unit if the total available resource is divided into N equally-sized distributed assignment units. In Table 2, two smaller distributed assignment units with the same size and certain relationship in their indices can be combined into a larger distributed assignment unit. The same tree structure and denotation of tree nodes as shown in FIG. 2A can be used to illustrate the combining of the distributed assignment units. The generalized rule of combining two smaller distributed assignment units into a larger distributed assignment unit is as follows:

$$D_k^N = D_k^{2N} + D_{k+N}^{2N} \quad (2)$$

Unlike the conventional distributed resource assignment method illustrated in FIG. 1B, the novel and improved method disclosed in the present invention for distributed resource assignment provides the benefits of both OFDMA and time division multiple access (TDMA). As shown in Table 2 above, the total radio resource within a frame is first divided only in time into two groups of contiguous OFDM symbols. Then, each group of OFDM symbols is further divided only in time into two smaller groups of contiguous OFDM symbols. The division continues until each divided distributed assignment unit covers one OFDM symbol. Then, each of the distributed assignment units is further divided only in frequency, into two smaller distributed assignment units that are interlaced in frequency subcarriers. Then, the division continues until reaching the size of the minimum distributed assignment unit. Therefore, the novel and improved distributed assignment method disclosed above allows multiple small data packets to share a wideband channel by multiplexing them in frequency (i.e. OFDMA) in a distributed fashion to explore the performance gain from frequency diversity. This strategy especially benefits the delay-sensitive and low data rate applications such as Voice over Internet Protocol (VoIP). When the data packets from different mobile stations are large enough to fill up one OFDM symbol, these data packets can be time division multiplexed (TDM). In this case, if the channel response is frequency-selective, each data packet still enjoys the performance gain from frequency diversity. Meanwhile, if the channel response is relatively flat for at least some mobile stations, the ability to time division multiplex data packets from different mobile stations within a frame can help the base station scheduler take advantage of multi-user scheduling gain with the channel feedbacks from these mobile stations.

Furthermore, the smallest bin in Table 2 can correspond to a group of contiguous subcarriers, called a tile, instead of corresponding to one subcarrier as described in Table 2. This is especially useful for the reverse link where individual pilot tones are needed within each tile for channel estimation and coherent demodulation.

Figure 2B:
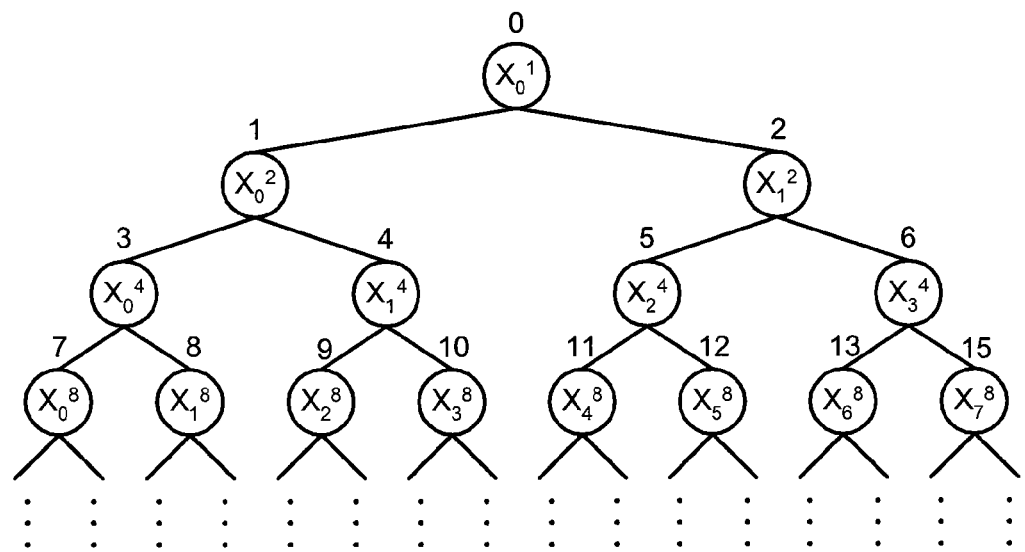

Alternatively, Table 3 below can replace Table 1 with a different denotation of the radio resource with the localized assignment, Table 4 below can replace Table 2 with a different denotation of the radio resource with the distributed assignment, and the tree structure and denotation of the tree nodes shown in FIG. 2A can be replaced by those in FIG. 2B, where the letter "X" can be "L" or "D". In this alternative denotation scheme, the generalized rule of combining two smaller assignment units of the same type into a larger assignment unit of the same type is as follows:

$$X_k^N = X_{2k}^{2N} + X_{2k+1}^{2N} \qquad (3)$$

where "X" can be "L" or "D".

TABLE 3

| Total Bandwidth (e.g. 5 MHz Bandwhidth with FFT Size of 512) | | | | | Data Frame OFDM Symbols 1~7 | | Subcarrier Index |
|---|---|---|---|---|---|---|---|
| | $L_0^1$ | $L_0^2$ | $L_0^4$ | $L_0^8$ | $L_0^{16}$ | $L_0^{32}$ | 0~15 |
| | | | | | | $L_1^{32}$ | 16~31 |
| | | | | | $L_1^{16}$ | $L_2^{32}$ | 32~47 |
| | | | | | | $L_3^{32}$ | 48~63 |
| | | | | $L_1^8$ | $L_2^{16}$ | $L_4^{32}$ | 64~79 |
| | | | | | | $L_5^{32}$ | 80~95 |
| | | | | | $L_3^{16}$ | $L_6^{32}$ | 96~111 |
| | | | | | | $L_7^{32}$ | 112~127 |
| | | | $L_1^4$ | $L_2^8$ | $L_4^{16}$ | $L_8^{32}$ | 128~143 |
| | | | | | | $L_9^{32}$ | 144~159 |
| | | | | | $L_5^{16}$ | $L_{10}^{32}$ | 160~175 |
| | | | | | | $L_{11}^{32}$ | 176~191 |
| | | | | $L_3^8$ | $L_6^{16}$ | $L_{12}^{32}$ | 192~207 |
| | | | | | | $L_{13}^{32}$ | 208~223 |
| | | | | | $L_7^{16}$ | $L_{14}^{32}$ | 224~239 |
| | | | | | | $L_{15}^{32}$ | Guard 240~255 |
| | | | | | $L_8^{16}$ | $L_{16}^{32}$ | Band 256~271 |
| | | | | | | $L_{17}^{32}$ | 272~287 |
| | | | $L_2^4$ | $L_4^8$ | $L_9^{16}$ | $L_{18}^{32}$ | 288~303 |
| | | | | | | $L_{19}^{32}$ | 304~319 |
| | | | | | $L_{10}^{16}$ | $L_{20}^{32}$ | 320~335 |
| | | | | | | $L_{21}^{32}$ | 336~351 |
| | | | | $L_5^8$ | $L_{11}^{16}$ | $L_{22}^{32}$ | 352~367 |
| | | | | | | $L_{23}^{32}$ | 368~383 |
| | | | | | $L_{12}^{16}$ | $L_{24}^{32}$ | 384~399 |
| | | | | | | $L_{25}^{32}$ | 400~415 |
| | | | $L_3^4$ | $L_6^8$ | $L_{13}^{16}$ | $L_{26}^{32}$ | 416~431 |
| | | | | | | $L_{27}^{32}$ | 432~447 |
| | | | | | $L_{14}^{16}$ | $L_{28}^{32}$ | 448~463 |
| | | | | | | $L_{29}^{32}$ | 464~479 |
| | | | | $L_7^8$ | $L_{15}^{16}$ | $L_{30}^{32}$ | 480~495 |
| | | | | | | $L_{31}^{32}$ | 496~511 |

TABLE 4

| | | | Data Frame | | | | | Subcarrier Index |
|---|---|---|---|---|---|---|---|---|
| OFDM Symbol 0 | OFDM Symbol 1 | OFDM Symbol 2 | OFDM Symbol 3 | OFDM Symbol 4 | OFDM Symbol 5 | OFDM Symbol 6 | OFDM Symbol 7 | |
| $D_0^1$ | | | | | | | | |
| $D_1^2$ | | | | $D_0^2$ | | | | |
| $D_3^4$ | | $D_2^4$ | | $D_1^4$ | | $D_0^4$ | | |
| $D_7^8$ | $D_6^8$ | $D_5^8$ | $D_4^8$ | $D_3^8$ | $D_2^8$ | $D_1^8$ | $D_0^8$ | |
| $D_4^{16}/D_{28}^{32}$ | $D_{12}^{16}/D_{24}^{32}$ | $D_{10}^{16}/D_{20}^{32}$ | $D_8^{16}/D_{16}^{32}$ | $D_6^{16}/D_{12}^{32}$ | $D_4^{16}/D_8^{32}$ | $D_2^{16}/D_4^{32}$ | $D_0^{16}/D_0^{32}$ | 0 |
| $D_{15}^{16}/D_{30}^{32}$ | $D_{13}^{16}/D_{26}^{32}$ | $D_{11}^{16}/D_{22}^{32}$ | $D_9^{16}/D_{18}^{32}$ | $D_7^{16}/D_{14}^{32}$ | $D_5^{16}/D_{10}^{32}$ | $D_3^{16}/D_6^{32}$ | $D_1^{16}/D_2^{32}$ | 1 |
| $D_{14}^{16}/D_{29}^{32}$ | $D_{12}^{16}/D_{25}^{32}$ | $D_{10}^{16}/D_{21}^{32}$ | $D_8^{16}/D_{17}^{32}$ | $D_6^{16}/D_{13}^{32}$ | $D_4^{16}/D_9^{32}$ | $D_2^{16}/D_5^{32}$ | $D_0^{16}/D_1^{32}$ | 2 |
| $D_{15}^{16}/D_{31}^{32}$ | $D_{13}^{16}/D_{27}^{32}$ | $D_{11}^{16}/D_{23}^{32}$ | $D_9^{16}/D_{19}^{32}$ | $D_7^{16}/D_{15}^{32}$ | $D_5^{16}/D_{11}^{32}$ | $D_3^{16}/D_7^{32}$ | $D_1^{16}/D_3^{32}$ | 3 |
| $D_4^{16}/D_{28}^{32}$ | $D_{12}^{16}/D_{24}^{32}$ | $D_{10}^{16}/D_{20}^{32}$ | $D_8^{16}/D_{16}^{32}$ | $D_6^{16}/D_{12}^{32}$ | $D_4^{16}/D_8^{32}$ | $D_2^{16}/D_4^{32}$ | $D_0^{16}/D_0^{32}$ | 4 |
| $D_{15}^{16}/D_{30}^{32}$ | $D_{13}^{16}/D_{26}^{32}$ | $D_{11}^{16}/D_{22}^{32}$ | $D_9^{16}/D_{18}^{32}$ | $D_7^{16}/D_{14}^{32}$ | $D_5^{16}/D_{10}^{32}$ | $D_3^{16}/D_6^{32}$ | $D_1^{16}/D_2^{32}$ | 5 |
| $D_{14}^{16}/D_{29}^{32}$ | $D_{12}^{16}/D_{25}^{32}$ | $D_{10}^{16}/D_{21}^{32}$ | $D_8^{16}/D_{17}^{32}$ | $D_6^{16}/D_{13}^{32}$ | $D_4^{16}/D_9^{32}$ | $D_2^{16}/D_5^{32}$ | $D_0^{16}/D_1^{32}$ | 6 |
| ⋮ | ⋮ | ⋮ | ⋮ | ⋮ | ⋮ | ⋮ | ⋮ | ⋮ |
| $D_{15}^{16}/D_{31}^{32}$ | $D_{13}^{16}/D_{27}^{32}$ | $D_{11}^{16}/D_{23}^{32}$ | $D_9^{16}/D_{19}^{32}$ | $D_7^{16}/D_{15}^{32}$ | $D_5^{16}/D_{11}^{32}$ | $D_3^{16}/D_7^{32}$ | $D_1^{16}/D_3^{32}$ | 223 |
| | | | | | | | | 224 |
| | | | | | | | | ⋮ |
| | | | | | | | | 287 |
| $D_4^{16}/D_{28}^{32}$ | $D_{12}^{16}/D_{24}^{32}$ | $D_{10}^{16}/D_{20}^{32}$ | $D_8^{16}/D_{16}^{32}$ | $D_6^{16}/D_{12}^{32}$ | $D_4^{16}/D_8^{32}$ | $D_2^{16}/D_4^{32}$ | $D_0^{16}/D_0^{32}$ | 288 |
| ⋮ | ⋮ | ⋮ | ⋮ | ⋮ | ⋮ | ⋮ | ⋮ | ⋮ |
| $D_{15}^{16}/D_{30}^{32}$ | $D_{13}^{16}/D_{26}^{32}$ | $D_{11}^{16}/D_{22}^{32}$ | $D_9^{16}/D_{18}^{32}$ | $D_7^{16}/D_{14}^{32}$ | $D_5^{16}/D_{10}^{32}$ | $D_3^{16}/D_6^{32}$ | $D_1^{16}/D_2^{32}$ | 505 |
| $D_{14}^{16}/D_{29}^{32}$ | $D_{12}^{16}/D_{25}^{32}$ | $D_{10}^{16}/D_{21}^{32}$ | $D_8^{16}/D_{17}^{32}$ | $D_6^{16}/D_{13}^{32}$ | $D_4^{16}/D_9^{32}$ | $D_2^{16}/D_5^{32}$ | $D_0^{16}/D_1^{32}$ | 506 |
| $D_{15}^{16}/D_{31}^{32}$ | $D_{13}^{16}/D_{27}^{32}$ | $D_{11}^{16}/D_{23}^{32}$ | $D_9^{16}/D_{19}^{32}$ | $D_7^{16}/D_{15}^{32}$ | $D_5^{16}/D_{11}^{32}$ | $D_3^{16}/D_7^{32}$ | $D_1^{16}/D_3^{32}$ | 507 |
| $D_4^{16}/D_{28}^{32}$ | $D_{12}^{16}/D_{24}^{32}$ | $D_{10}^{16}/D_{20}^{32}$ | $D_8^{16}/D_{16}^{32}$ | $D_6^{16}/D_{12}^{32}$ | $D_4^{16}/D_8^{32}$ | $D_2^{16}/D_4^{32}$ | $D_0^{16}/D_0^{32}$ | 508 |
| $D_{15}^{16}/D_{30}^{32}$ | $D_{13}^{16}/D_{26}^{32}$ | $D_{11}^{16}/D_{22}^{32}$ | $D_9^{16}/D_{18}^{32}$ | $D_7^{16}/D_{14}^{32}$ | $D_5^{16}/D_{10}^{32}$ | $D_3^{16}/D_6^{32}$ | $D_1^{16}/D_2^{32}$ | 509 |
| $D_{14}^{16}/D_{29}^{32}$ | $D_{12}^{16}/D_{25}^{32}$ | $D_{10}^{16}/D_{21}^{32}$ | $D_8^{16}/D_{17}^{32}$ | $D_6^{16}/D_{13}^{32}$ | $D_4^{16}/D_9^{32}$ | $D_2^{16}/D_5^{32}$ | $D_0^{16}/D_1^{32}$ | 510 |
| $D_{15}^{16}/D_{31}^{32}$ | $D_{13}^{16}/D_{27}^{32}$ | $D_{11}^{16}/D_{23}^{32}$ | $D_9^{16}/D_{19}^{32}$ | $D_7^{16}/D_{15}^{32}$ | $D_5^{16}/D_{11}^{32}$ | $D_3^{16}/D_7^{32}$ | $D_1^{16}/D_3^{32}$ | 511 |

Figure 3:
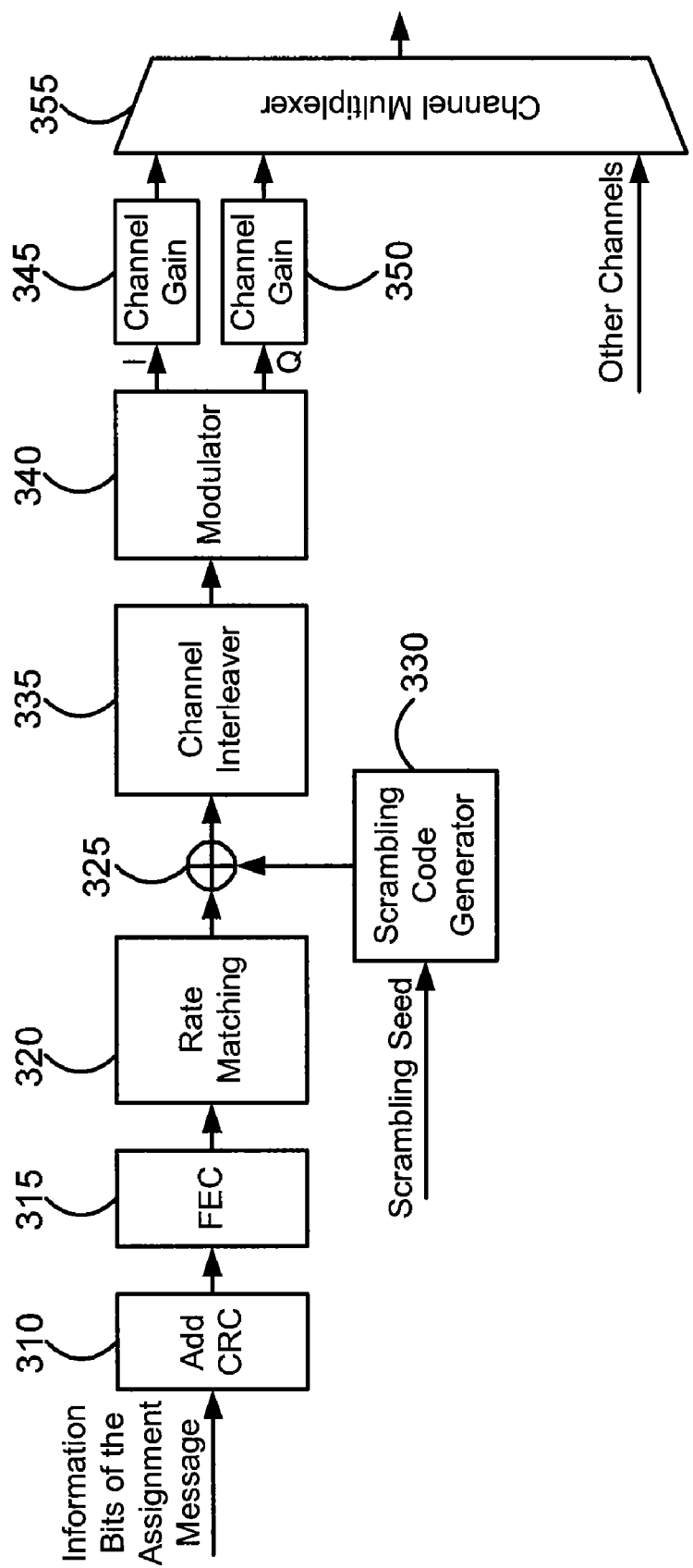
FIG. 3 provides a block diagram of an exemplary control channel for the communication of assignment messages.

FIG. 3 illustrates an exemplary channel structure for the forward shared scheduling channel (F-SSCH) that sends the assignment messages to the mobile stations. The assignment message contains at least a field of Media Access Control Index (MACID) to identify the intended mobile station, a field of Node Index (NodeID) to identify the assigned radio resource in time and frequency, a field of Assignment Type to identify whether the assignment is a localized assignment or a distributed assignment, a field of Packet Format (PF) to identify the encoder packet size, modulation level, and code rate of the data packet. In addition, the assignment message may contain fields for message type, multiple antenna mode, etc.

The field of Assignment Type in the F-SSCH can be eliminated in a simplified scheme by limiting the localized assignment units to those with a first set of sizes and limiting the distributed assignment units to those with a second set of sizes, wherein none of the sizes in the first set exists in the second set and none of the sizes in the second set exists in the first set. For example, in the 5 MHz system illustrated above, the localized assignment units can be limited to $L_0^1, L_i^2, L_j^4,$ and $L_m^8$, where i, j, and m are integers, and $0 \leq i \leq 1$, $0 \leq j \leq 3$, $0 \leq m \leq 7$. Meanwhile, the distributed assignment units can be limited to $D_x^{16}$ and $D_y^{32}$, where x and y are integers, and $0 \leq x \leq 15$, $0 \leq y \leq 31$. Therefore, the assignment size implies which assignment type is used, and there is no need to have an explicit field of Assignment Type in the F-SSCH.

Referring to FIG. 3, in an embodiment of the present invention, the Cyclic Redundant Check (CRC) bits are first added to the information bits of the assignment message by CRC element 310. The encoder 315 adds forward error correction (FEC) coding to the output sequence of CRC element 310. Then, a rate matching element 320 repeats and/or punctures the encoded bits from encoder 315 in order to match the rate on the F-SSCH to certain fixed rate. A scrambler 325 then scrambles the output sequence from the rate matching element 320 with a scrambling code that is generated from a scrambling code generator 330. The scrambling code generator 330 is a PN register that is seeded with the channel identity of the F-SSCH, the current frame number, and optionally, the scrambling type. The scrambled sequence is then interleaved by channel interleaver 335. The interleaved sequence is then modulated by modulator 340. The in-phase (I) and quadrature (Q) outputs of modulator 340 are then gain-controlled by channel gain elements 345 and 350. The output complex signal is then multiplexed with the other channels by channel multiplexer 355 using Code Division Multiple Access (CDMA), Time Division Multiple Access (TDMA), OFDMA, or any combination of the above.

Figure 4:
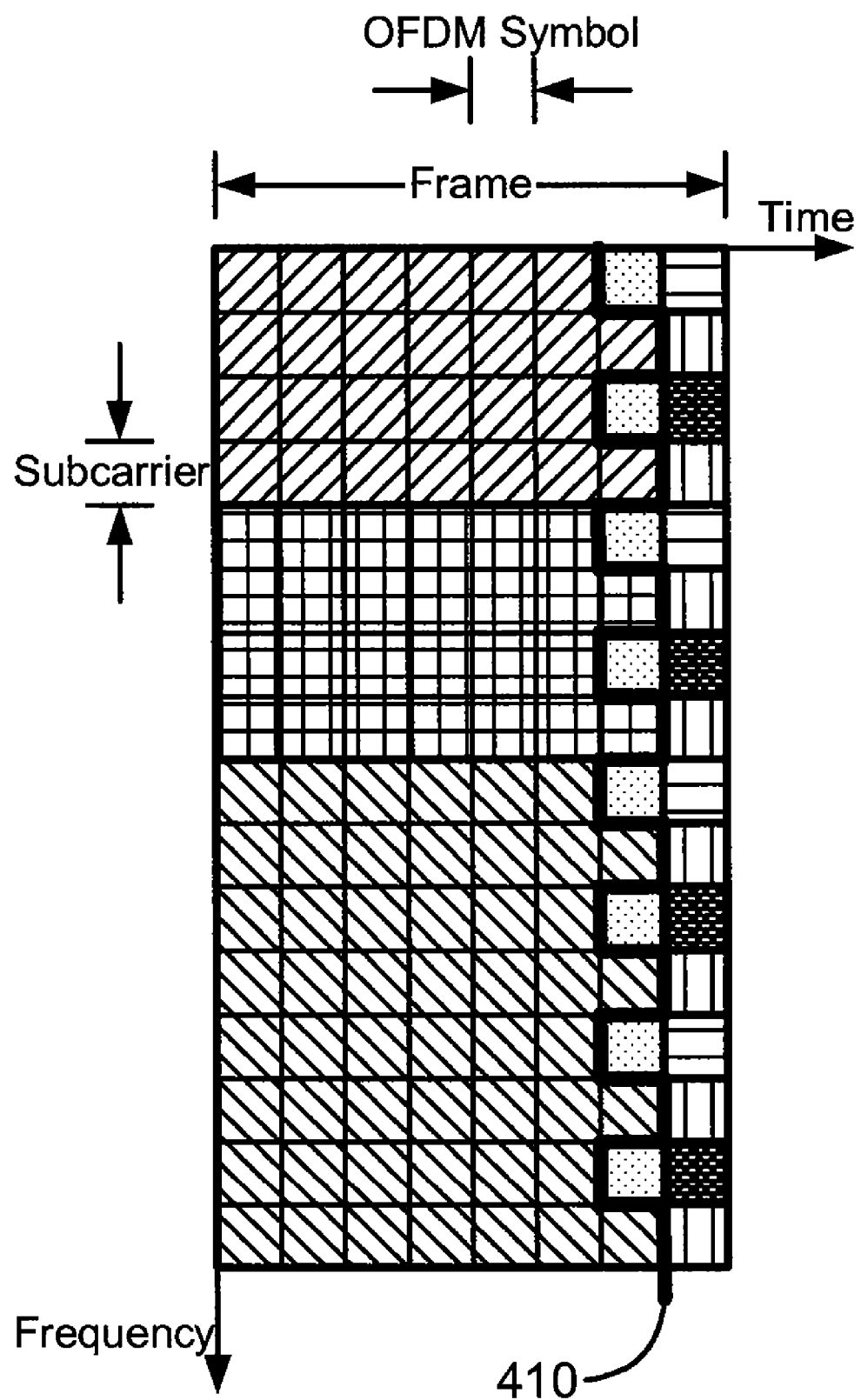
FIG. 4 provides an exemplary embodiment of multiplexing two types of resource assignment in the same data frame by providing a demarcation line between two types of assignment zones with each zone having only one type of resource assignment.

Referring to FIG. 4, the frame is split into a localized assignment zone (the first zone) and a distributed assignment zone (the second zone). A number of consecutive OFDM symbols are used for the mobile stations with the localized assignment and the remaining OFDM symbols in the same frame are used for the mobile stations with the distributed assignment. Because the mobile stations with the distributed assignment may not be able to fill up the far-left OFDM symbol in their zone, the mobile stations with the localized assignment share the remaining subcarriers in that OFDM symbol. Therefore, the demarcation line 410 may be a straight line, or it may be a rectangular-pulse-shaped line.

In one embodiment of the present invention, the two assignment zones are time division multiplexed. The two assignment zones may share at most one OFDM symbol in time, during which time the two assignment zones do not overlap in frequency subcarriers. The preferred embodiment is that the localized assignment zone is transmitted before the distributed zone of the same frame. In an alternative embodiment, the distributed assignment zone is transmitted before the localized zone of the same frame.

In order for the mobile stations with the localized assignment to decode their data packet correctly, they need to know precisely where the demarcation line 410 is. A Layer 3 signaling message can be used to broadcast the demarcation information in a slow fashion (due to the long latency associated with Layer 3 messages) However, the lack of an ability to change the demarcation line 410 in a dynamic frame-by-frame fashion puts some constraints on the base station scheduler, therefore undermining the performance of the scheduler. A MAC Layer control message can be used to broadcast the demarcation information in a relatively fast fashion. However, it would require additional base station transmit power and subcarriers, which would otherwise be available for the transmission of data packets.

A preferred embodiment of the present invention for indicating the demarcation line 410 between the localized assignment zone and the distributed assignment zone is described in the following sections.

In the example shown in FIG. 4, three different mobile stations, indicated by three different shade patterns, are assigned in the localized assignment zone. The resource assigned to each of them can have different sizes. Four different mobile stations, indicated by four other shade patterns, are assigned in the distributed assignment zone. The resource assigned to each of them can also have different sizes. We define the Last Distributed Assignment as the distributed assignment that is the farthest away from the beginning of the distributed assignment zone in time and the last in frequency location. In Table 2, the beginning of the distributed assignment zone is the end of the data frame. Therefore, the radio resource units for the distributed assignments are assigned from top to bottom in frequency first, then from left to right in time. The assignment message for the Last Distributed Assignment is sent with sufficient power such that the intended mobile station for the Last Distributed Assignment and all mobile stations that are scheduled with the localized assignment in the same frame can decode the Last Distributed Assignment message correctly. The Node Index field in the Last Distributed Assignment message indicates which radio resource in time and frequency is assigned to the mobile station that is intended for the Last Distributed Assignment, implying where the entire distributed assignment zone is. As a result, each mobile station that is scheduled with the localized assignment in the same frame will know the demarcation line 410 and be able to retrieve the modulation symbols for its data packet correctly.

Figure 5:
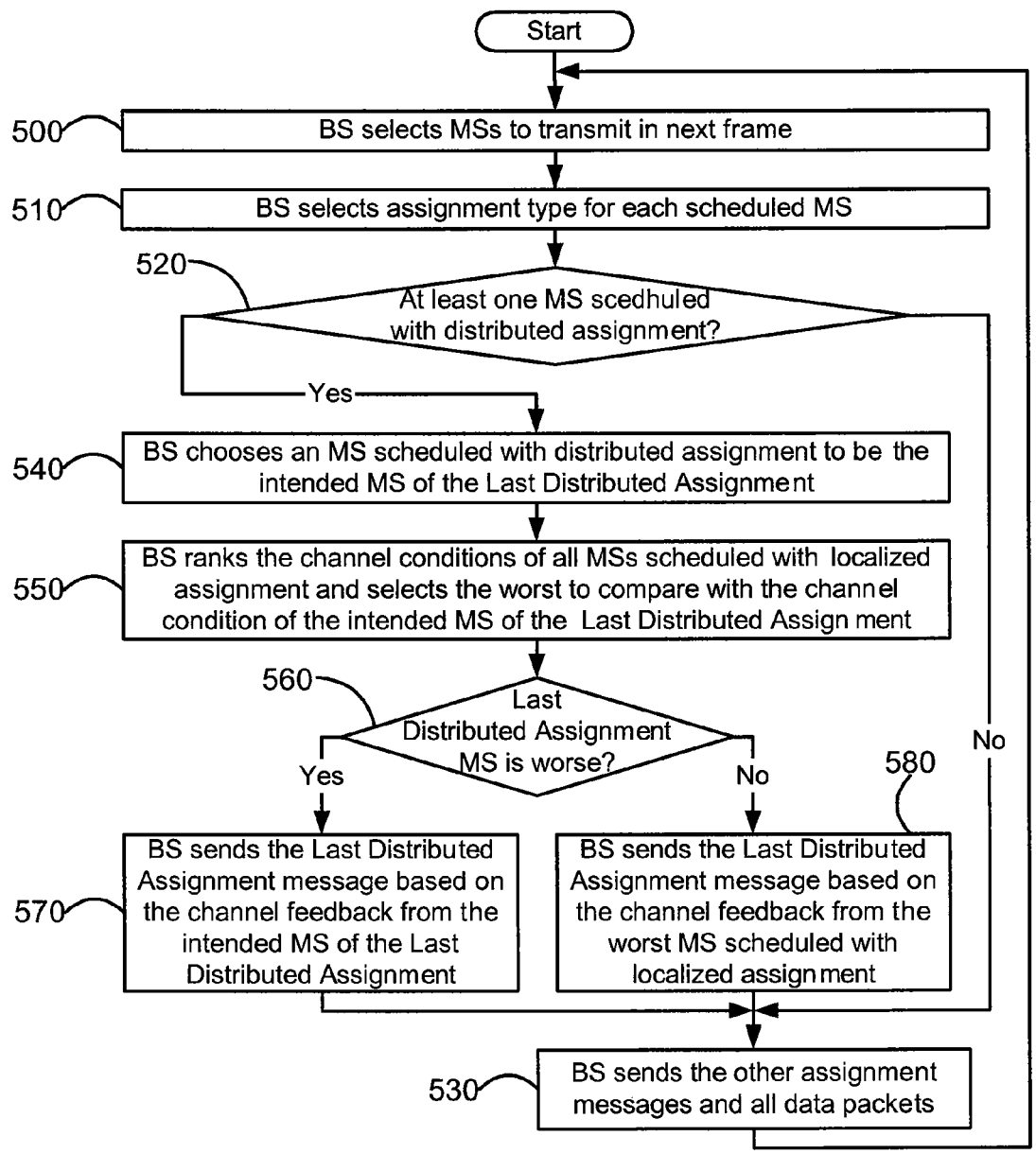
FIG. 5 provides a flowchart for the procedure of an exemplary base station in sending assignment messages and data packets.

As shown in FIG. 5, according to one aspect of the present invention, the base station (BS) first selects which mobile stations are to be scheduled for transmission in the next frame in step 500 and which type of assignment is used for each of those scheduled mobile stations (MS) in step 510. In step 520, the base station determines if there is at least one mobile station that is scheduled with the distributed assignment. If none is selected, the base station sends the assignment messages and data packets for those mobile stations with the localized assignment in step 530. Then, the base station waits until the next frame. If there is at least one mobile station that is scheduled with the distributed assignment, the base station selects a mobile station that is scheduled with the distributed assignment to be the intended mobile station for the Last Distributed Assignment in step 540. For example, the base station can select the mobile station with the worst channel condition among all mobile stations that are scheduled with the distributed assignment to be the intended mobile station of the Last Distributed Assignment. This selection method can help to utilize the base station's transmit power more efficiently, but it should be obvious to those skilled in the art that other selection methods may be used. Next, the base station ranks the channel conditions of all mobile stations that are scheduled with the localized assignment based via their channel condition feedback and selects the worst one to compare with the channel conditions of the intended mobile station of the Last Distributed Assignment in step 550. In step 560, the base station determines if the channel condition of the intended mobile station of the Last Distributed Assignment is worse than the worst channel condition among all mobile stations that are scheduled with the localized assignment. If yes, the base station sends the Last Distributed Assignment message with the MACID of the intended mobile station in it and with sufficient power to ensure the intended mobile station of the Last Distributed Assignment can decode the Last Distributed Assignment message correctly in step 570. If no, the base station sends the Last Distributed Assignment message with the MACID of the intended mobile station in it and with sufficient power to ensure the mobile station with the worst channel conditions among all mobile stations that are scheduled with the localized assignment can decode the Last Distributed Assignment message correctly in step 580. The base station sends the other assignment messages and all data packets in step 530. Then, the base station waits until the next frame. It should be obvious to those skilled in the art that the term sufficient power throughout this description may or may not includes additional marginal power.

Figure 6:
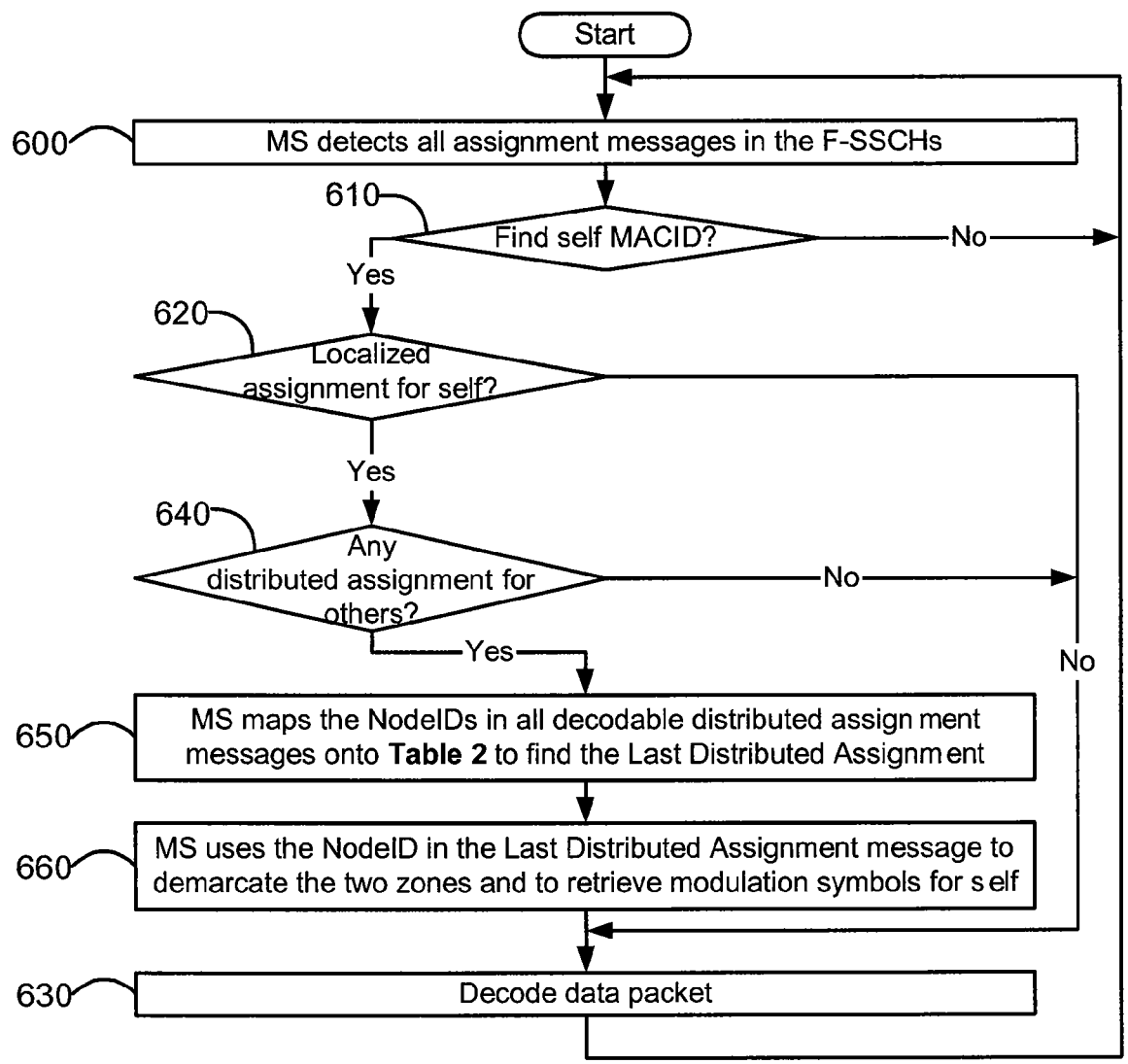
FIG. 6 provides a flowchart for the procedure of exemplary mobile station in detecting the assignment messages and data packets, where the mobile station identifies the Last Distributed Assignment by the position of the NodeIDs in each decoded distributed assignment message.

Referring to FIG. 6, the mobile station (MS) first detects all assignment messages in all F-SSCHs in step 600. Then the mobile station determines if self MACID has been found in any of those assignment messages in step 610. If no, the mobile station waits until the next frame. If yes, the mobile station determines if its assignment type is the localized assignment in step 620. If no, the MS decodes the data packet according to the Node Index in his own assignment message in step 630 and waits until the next frame. If yes, in step 640, the mobile station determines if any distributed assignment message for another mobile station is detected on any F-SSCH. If no, the MS decodes the data packet according to the Node Index in his own assignment message in step 630 and waits until the next frame. If yes, in step 650, the mobile station maps all Node Indices that are decoded correctly from the distributed assignment messages onto the distributed resource denotation table that is being used by the base station, such as Table 2, and identifies the distributed assignment that is the farthest away from the beginning of the distributed assignment zone in time and the last in frequency location in Table 2 among all distributed assignments within the same OFDM symbol as the Last Distributed Assignment. In step 660, the mobile station uses the Node Index in the Last Distributed Assignment message to demarcate the two assignment zones and to retrieve the modulation symbols for itself. The mobile station decodes the data packet in step 630 and then waits until the next frame.

In the mobile station procedure illustrated in FIG. 6 and described above, a mobile station scheduled with the localized assignment may miss the detection of the true Last Distributed Assignment message and thus, the true demarcation of the two assignment zones, causing failure in decoding its data packet.

To enhance the robustness of the scheme of using the Last Distributed Assignment message to indicate the demarcation of the two assignment zones, novel methods are described below to distinguish the Last Distributed Assignment message from the other distributed assignment messages.

In one embodiment, if there is at least one distributed assignment in the frame, the Last Distributed Assignment message is always carried on the first F-SSCH. The first F-SSCH can be distinguished from the other F-SSCH's by using a special orthogonal code, scrambling code, frequency subband, sub-field within a long field of assignment message, time, or time-frequency bin, which is specified by the individual base station, can be different from base station to base station, and is informed to all mobile stations by signaling messages. If there is no distributed assignment in the frame, the first F-SSCH can be used for carrying a localized assignment message. In this case, because all mobile stations that are scheduled with the localized assignment need to detect correctly that the first F-SSCH is carrying a localized assignment message, the first F-SSCH should be sent with sufficient power to ensure all mobile stations that are scheduled with the localized assignment can detect it correctly. Further, selecting the mobile station with the worst channel conditions among all mobile stations that are scheduled with localized assignment can help to utilize the base station's transmit power more efficiently.

Figure 7:
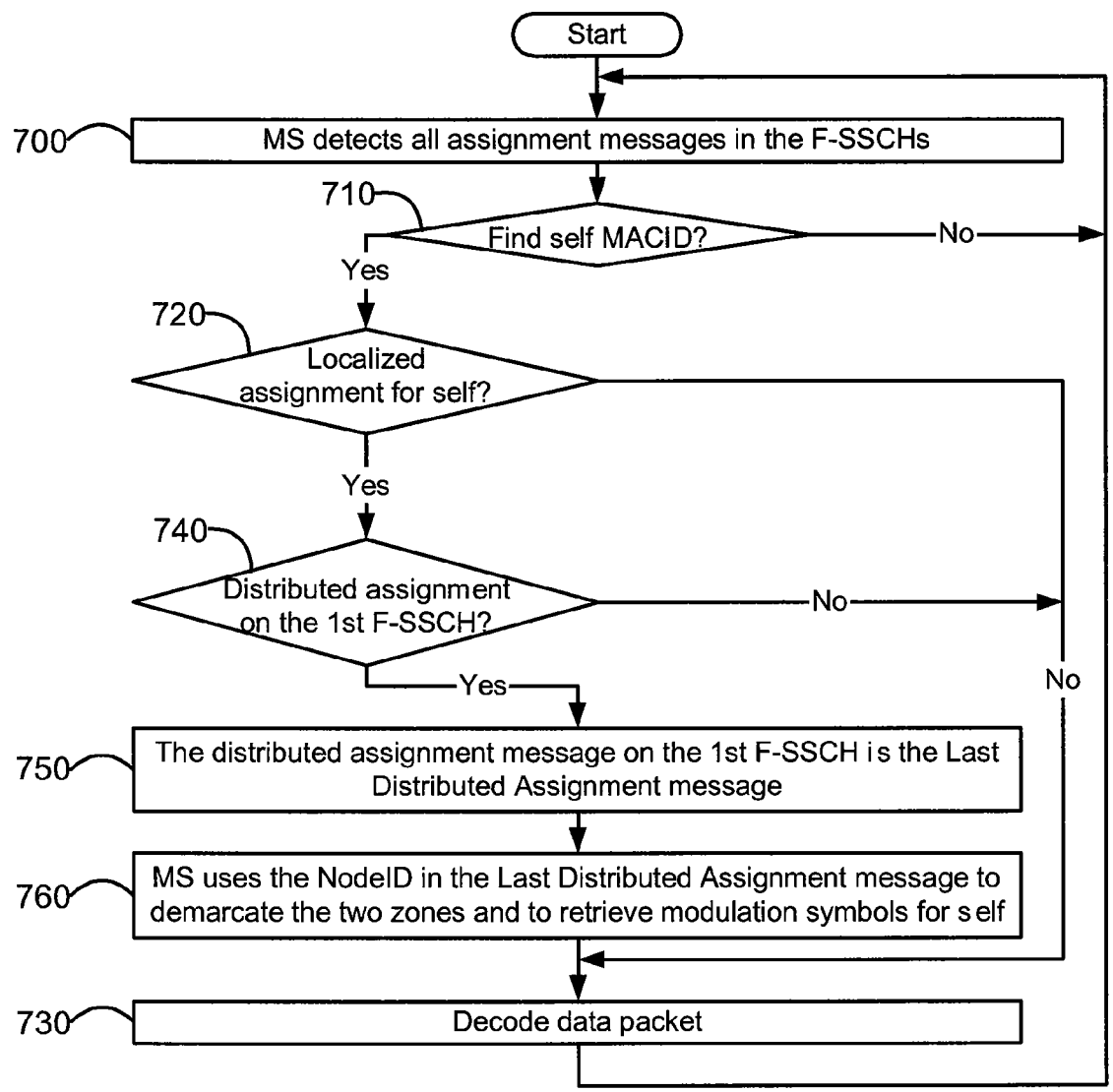
FIG. 7 provides a flowchart for the procedure of an improved mobile station in detecting the assignment messages and data packets, wherein the mobile station identifies the Last Distributed Assignment only on the first F-SSCH.

Referring to FIG. 7, the mobile station first detects all assignment messages in all F-SSCHs in step 700. Then, the mobile station determines if its own MACID has been found in any of those assignment messages in step 710. If no, the mobile station waits until the next frame. If yes, the mobile station determines if the assignment type for it is the localized assignment in step 720. If no, the MS decodes the data packet according to the Node Index in its own assignment message in step 730 and then waits until the next frame. If yes, in step 740, the mobile station further determines if a distributed assignment message is detected on the first F-SSCH. If no, the MS decodes the data packet according to the Node Index in its own assignment message in step 730 and then waits until the next frame. If yes, in step 750, the mobile station takes the distributed assignment message on the first F-SSCH as the Last Distributed Assignment message. In step 760, the mobile station uses the Node Index in the Last Distributed Assignment message to demarcate the two assignment zones and to retrieve the modulation symbols intended for it. The mobile station decodes the data packet in step 730, and then waits until the next frame.

In an alternative embodiment, the F-SSCH that carries the Last Distributed Assignment message is scrambled by scrambler 325 as shown in FIG. 3 with a second scrambling method while the F-SSCHs for the other distributed assignment messages or for any localized assignment messages are scrambled by scrambler 325 with a first scrambling method. The two scrambling methods can differ in the PN register structure or differ in the scrambling seed, for example, by adding a field of Scrambling Type in the scrambling seed. Another aspect of this embodiment is that when there is at least one localized assignment and no distributed assignment in the frame, at least one F-SSCH that carries a localized assignment message can be scrambled with the second scrambling method to indicate that there is no distributed assignment in the current frame, and it should be sent with sufficient power to ensure that all mobile stations that are scheduled with the localized assignment in the frame can decode it correctly. Because an F-SSCH can be scrambled in two possible ways, the mobile station needs to detect each F-SSCH with two possible de-scrambling methods before determining, in step 600, what message is carried on it. As a result, the detection performance on each F-SSCH can be potentially degraded. Therefore, further enhancement of this embodiment by limiting the two possible scrambling methods only on the first F-SSCH, which is the only F-SSCH that can carry the Last Distributed Assignment message, is preferable. However, it should be clear to those skilled in the art that other implementations are possible. We will describe how to use this preferred combination to provide more flexibility in multiplexing different type of assignments in the later sections.

If there are a large number of mobile stations that are scheduled with the distributed assignment with the demarcation strategy as described above and as shown in FIG. 4, the radio resources assigned for any mobile stations that are scheduled with the localized assignment in the same frame are dramatically reduced by the distributed assignment zone, and thus, the assignment efficiency becomes low. If there are only a few mobile stations scheduled with the localized assignment in the same frame, the base station can switch to a second demarcation strategy as shown in the example in FIG. 8, according to another aspect of the present invention.

Figure 8:
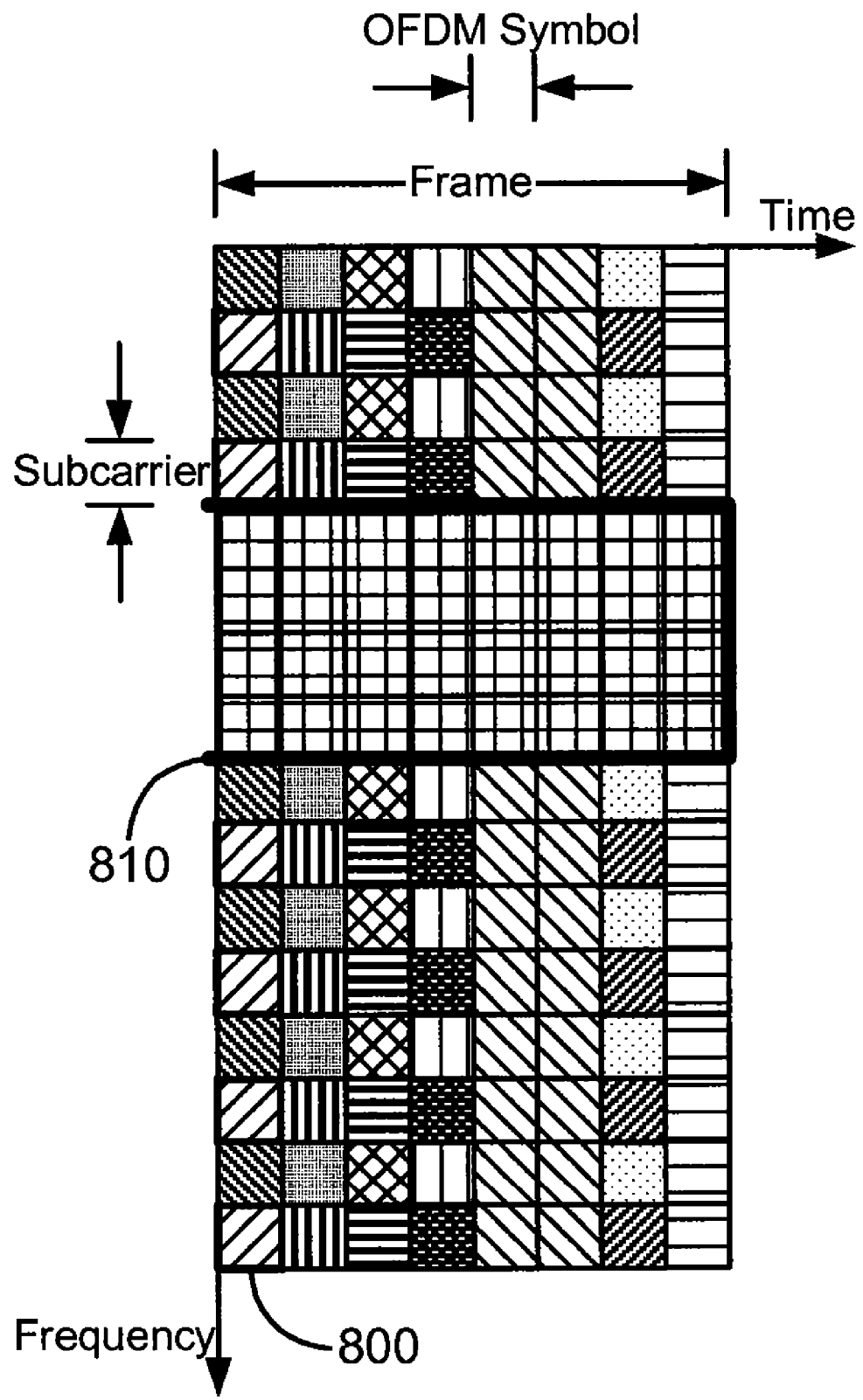
FIG. 8 provides a flowchart for a second demarcation strategy for multiplexing two types of resource assignments in the same data frame.

Referring to FIG. 8, the radio resource 800 of the Last Distributed Assignment reaches the end of the potential distributed assignment zone, which is also the beginning of the data frame as well as the beginning of the localized assignment zone. In the second demarcation strategy, the demarcation line 810 between the two assignment zones becomes the frequency boundaries of the localized assignments based on the NodeIDs in those localized assignment messages and a localized resource denotation table such as Table 1, meanwhile the localized assignment zone stretches from the beginning of the data frame to the end of the data frame. So, the two assignment zones becomes frequency division multiplexed (FDM), as opposed to TDM in the first demarcation strategy shown in FIG. 4. And in the second demarcation strategy, the signaling of the demarcation line is the NodeIDs in all localized assignment messages, as opposed to the NodeID in the Last Distributed Assignment message in the first demarcation strategy.

The communication of the switching between these two demarcation strategies in the example illustrated in FIG. 8 is based on whether the radio resource 800 of the Last Distributed Assignment reaches the end of the potential distributed assignment zone. In a more specific example using Table 2, considering that OFDM Symbol 0 is used for the F-SSCHs and the data frame begins from OFDM Symbol 1 to Symbol 7, a Last Distributed Assignment message with a NodeID corresponding to any of $D_0^1$, $D_1^2$, $D_3^4$, $D_3^8$, $D_{11}^{16}$, or $D_{27}^{32}$ indicates that the second demarcation strategy is used in the current frame and all scheduled mobile station should decode their data packet accordingly. In order for all of the scheduled mobile stations to understand that the second demarcation strategy is being used, the F-SSCH that carries the Last Distributed Assignment message should be sent with sufficient power to ensure that all scheduled mobile stations can decode it correctly. Using the Last Distributed Assignment message for the mobile station with the worst channel condition among all scheduled mobile station with the distributed assignment can help to utilize the base station transmit power more efficiently as mentioned before, but it is not required. In addition, in order for all mobile stations scheduled with the distributed assignment to understand where the demarcation line 800 is with the second demarcation strategy being used, any localized assignment message should be sent with sufficient power to ensure all the mobile stations that are scheduled with the distributed assignment to decode the localized assignment message correctly.

Furthermore, using the very end of the potential distributed assignment zone as the benchmark for switching between the two demarcation strategies may be too restrictive. For example, even if the Last Distributed Assignment message has a NodeID of $D_3^{16}$ in the specific example described above, there is not enough radio resource left to make any meaningful localized assignment. In this case, the base station can use the NodeID of $D_{11}^{16}$ instead of $D_3^{16}$ on the Last Distributed Assignment message so that the restrictive benchmark is still met while leaving the radio resource on $D_3^{16}$ un-used. Or, a more relaxed benchmark can be used such that if the radio resource assigned for the Last Distributed assignment has reached certain a portion of the potential distributed assignment zone, the second demarcation strategy is used. Otherwise, the first demarcation strategy is used. The exact benchmark should be known to all mobile stations by default or by signaling messages. It should be clear to those skilled in the art that a variety of strategies can be used to decide upon when to switch to the second demarcation strategy.

In addition, when the second demarcation strategy is used and there is no localized assignment being scheduled in the same frame, a mobile station that is scheduled with the distributed assignment may not be able to tell whether it has missed the detection of any localized assignment messages or whether there is no localized assignment.

According to yet another aspect of the present invention, if there is at least one distributed assignment and at least one localized assignment in the frame, the Last Distributed Assignment message is sent on the first F-SSCH and scrambled with the first scrambling method. If there is at least one distributed assignment and no localized assignment, the Last Distributed Assignment message is sent on the first F-SSCH and scrambled with the second scrambling method.

A third scrambling method can be used to scramble the first F-SSCH when it carries the Last Distributed Assignment and the second demarcation strategy is being used in the frame. In this alternative method of indicating the switching of demarcation strategies, the signaling of the switching of the demarcation strategy is no longer based on whether the NodeID in the Last Distributed Assignment reaches the benchmark or not. It is based on whether the third scrambling method is used on the first F-SSCH or not. However, the former method is more preferable as it does not increase the number of detection hypnoses on the first F-SSCH and therefore, doesn't degrade the detection performance of the first F-SSCH.

Figure 9:
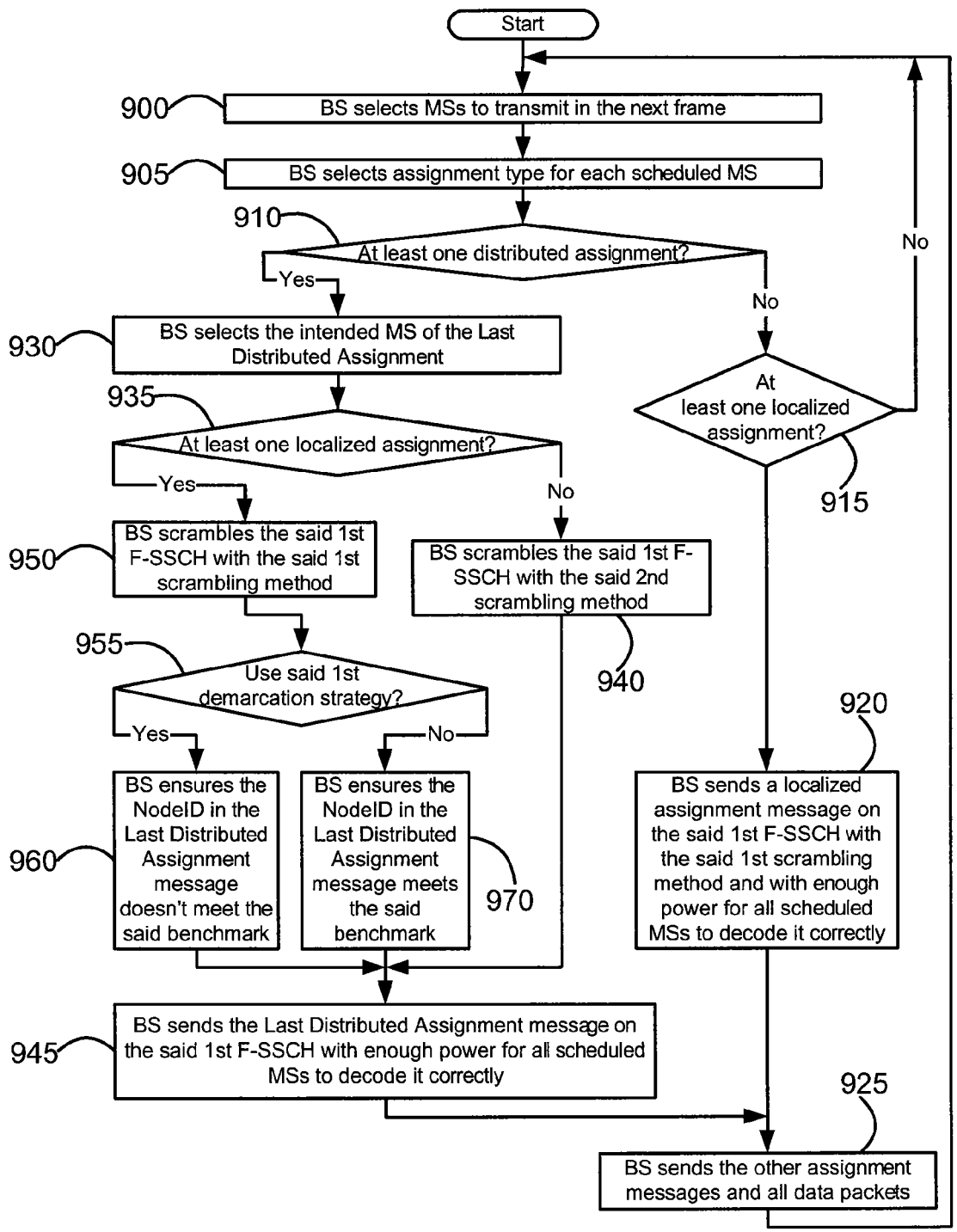
FIG. 9 illustrates a preferred embodiment of the base station procedure for sending the assignment messages and data packets.

As shown in FIG. 9, according to the preferred embodiment of the present invention, the base station (BS) first selects which mobile stations is to be scheduled for transmission in the next frame in step 900 and which type of assignment is used for each of those scheduled mobile stations in step 905. In step 910, the base station determines if there is at least one mobile station (MS) that is scheduled with the distributed assignment. If there is no mobile station that is scheduled with the distributed assignment, the base station determines if there is at least one mobile station that is scheduled with the localized assignment in step 915. If no, the base station waits until the next frame. If yes, in step 920, the base station sends a localized assignment message on the first F-SSCH with the first scrambling method and with sufficient power for all scheduled mobile stations to decode it correctly. Then, the base station sends the other assignment messages and all data packets in step 925. Then, the base station waits until the next frame. If the base station determines that there is at least one mobile station that is scheduled with the distributed assignment in step 910, the base station selects a mobile station that is scheduled with the distributed assignment to be the intended mobile station for the Last Distributed Assignment in step 930. For example, the base station can select the mobile station with the worst channel condition among all mobile stations that are scheduled with the distributed assignment to be the intended mobile station of the Last Distributed Assignment. This selection method can help to utilize the base station's transmit power more efficiently, but it is not required. Next, in step 935, the base station determines if there is at least one mobile station that is scheduled with the localized assignment. If there is no mobile station scheduled with the localized assignment, the base station scrambles the first F-SSCH with the second scrambling method in step 940. Then, the base station sends the Last Distributed Assignment message on the first F-SSCH with sufficient power for all scheduled mobile stations to decode it correctly in step 945. Then, the base station sends the other assignment messages and all data packets in step 925. Then, the base station waits until the next frame. If the base station determines that there is at least one mobile station that is scheduled with the localized assignment in step 935, the base station scrambles the first F-SSCH with the first scrambling method in step 950. Then, in step 955, the base station determines which demarcation strategy is to be used in the frame. If the first demarcation strategy is to be used, the base station ensures the NodeID in the Last Distributed Assignment message does not meet the benchmark in step 960. If the second demarcation strategy is to be used, the base station ensures the NodeID in the Last Distributed Assignment message meets the benchmark in step 970. Then, the base station sends the Last Distributed Assignment message on the first F-SSCH with sufficient power for all scheduled mobile stations to decode it correctly in step 945. The base station sends the other assignment messages and all data packets in step 925. Then, the base station waits until the next frame.

Figure 10:
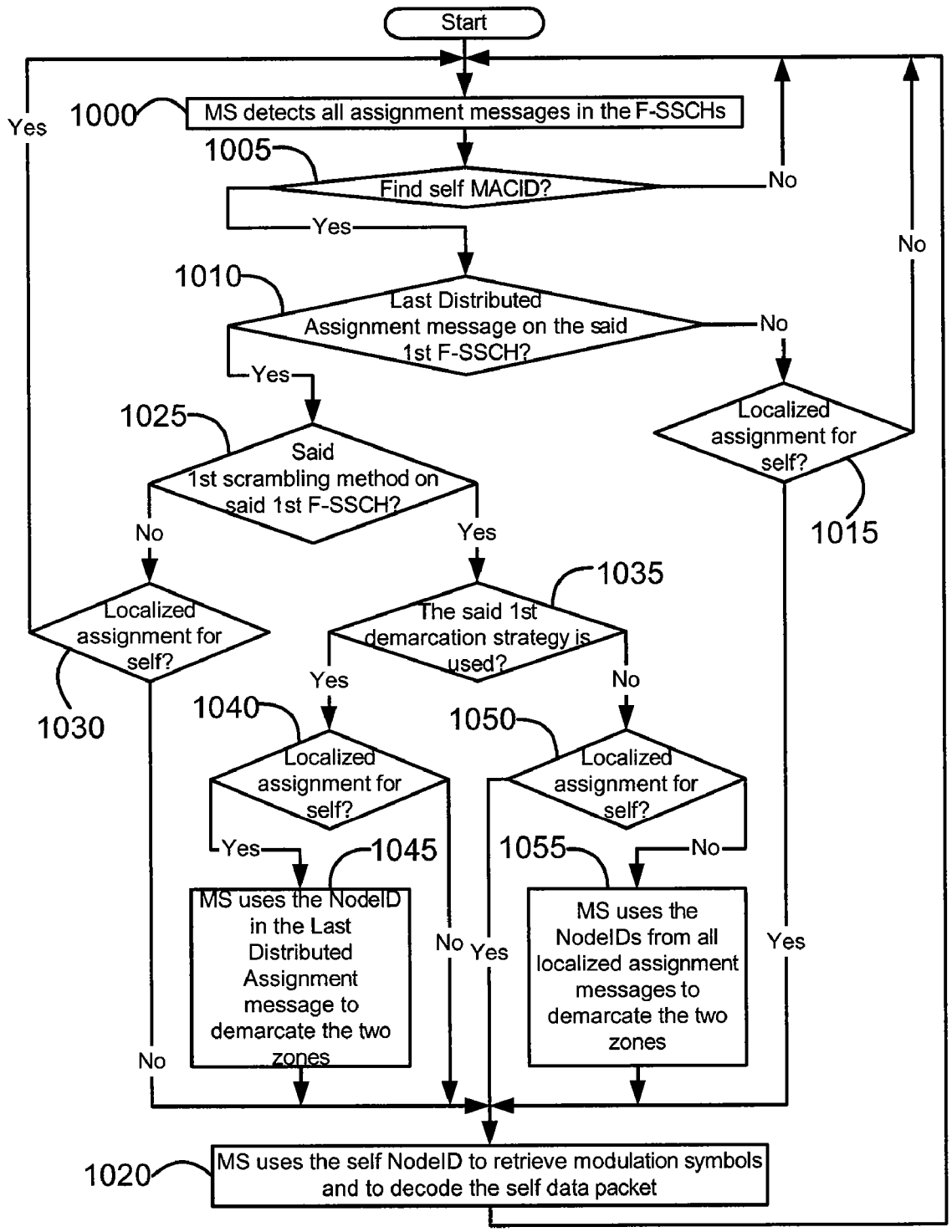
FIG. 10 illustrates a preferred embodiment of the mobile station procedure for detecting the assignment messages and data packets.

Referring to FIG. 10, the mobile station first detects all assignment messages on all F-SSCHs in step 1000. Then, the mobile station determines if its MACID has been found in any of these assignment messages in step 1005. If no, the mobile station waits until the next frame. If yes, the mobile station determines if there is a distributed assignment message on the first F-SSCH in step 1010. If no, the mobile station further determines if the assignment for it is a localized assignment in step 1015. If no, there is a detection error and the mobile station waits until the next frame because the assignment for this mobile station cannot be a distributed assignment if the assignment on the first F-SSCH is not a distributed assignment. If the mobile station determines that the assignment for it is a localized assignment in step 1015, the mobile station uses the NodeID in its assignment message to retrieve the modulation symbols for its data packet and decodes that data packet in step 1020. Then, the mobile station waits until the next frame. If the mobile station determines that there is a distributed assignment message on the first F-SSCH in step 1010, this distributed assignment message is the Last Distributed Assignment message. The mobile station then determines if the first F-SSCH is scrambled with the first scrambling method in step 1025. If no, the mobile station then determines if the assignment for it is a localized assignment in step 1030. If yes, there is a detection error and mobile station waits until the next frame, because if the mobile station determines that the first F-SSCH is scrambled with the second scrambling method in step 1025, there is no localized assignment in the frame. If the mobile station determines that the assignment for itself is a localized assignment in step 1030, the mobile station uses the NodeID in its assignment message to retrieve the modulation symbols for its data packet and decodes that data packet in step 1020. Then, the mobile station waits until the next frame. If the mobile station determines that the first F-SSCH is scrambled with the first scrambling method in step 1025, the mobile station determines if the first demarcation strategy is used in the frame in step 1035. If yes, the mobile station then determines if the assignment for it is a localized assignment in step 1040. If no, the mobile station uses the NodeID in its assignment message to retrieve the modulation symbols for its data packet and decodes that data packet in step 1020. Then, the mobile station waits until the next frame. If yes, the mobile station first uses the NodeID in the Last Distributed Assignment message to derive the demarcation line between the two assignment zones in step 1045. Then, the mobile station uses the NodeID in its assignment message and the demarcation line to retrieve the modulation symbols for its data packet and decodes that data packet in step 1020. Then, the mobile station waits until the next frame. If the mobile station determines that the second demarcation strategy is used in the frame in step 1035, the mobile station then determines if the assignment for it is a localized assignment in step 1050. If yes, the mobile station uses the NodeID in its assignment message to retrieve the modulation symbols for its data packet and decodes that data packet in step 1020. Then, the mobile station waits until the next frame. If no, the mobile station first uses the NodeIDs in all localized assignment messages to derive the demarcation line between the two assignment zones in step 1055. Then, the mobile station uses the NodeID in its assignment message and the demarcation line to retrieve the modulation symbols for its data packet and decodes that data packet in step 1020. Then, the mobile station waits until the next frame.

The exemplary embodiments disclosed in the present invention are mostly described for the forward link (i.e. from the base station to the mobile station) for convenience. The same novel and improved methods and apparatus can be applied to the reverse link (i.e. from the mobile station to the base station). Some differences between the forward link and the reverse link include that for the reverse link, each distributed assignment unit shown in Table 2 or Table 4 consists of a number disjoint tiles and each tile consists of a number contiguous subcarriers since individual pilot tones are needed within each tile for channel estimation and coherent demodulation on the reverse link. In the reverse link, the mobile stations decipher the demarcation line according to the various embodiments described above, for the purpose of selecting the correct radio resource that has been scheduled by the base station to send the data packets such that the base station may decode it correctly and not for the purpose of decoding the data packet sent by the base station.

When the assignment messages for the forward link and the reverse link are sharing the same pool of F-SSCHs, the Last Distributed Assignment message for the forward link, if it exists in the frame, is sent only on the first F-SSCH, and the Last Distributed Assignment message for the reverse link, if it exists in the same frame, is sent only on a second F-SSCH. The second F-SSCH is distinguished from the other F-SSCHs in a similar way that the first F-SSCH is distinguished from the other F-SSCHs (for example, by using a special orthogonal code, scrambling code, frequency subband, subfield within a long field of assignment message, time, or time-frequency bin, which is specified by the individual base station, can be different from base station to base station, and is informed to all mobile stations by signaling messages).

Table 5 below shows the rules of assigning messages to the first (1st) F-SSCH and the second (2nd) F-SSCH under various scenarios depending on the numbers of the distributed assignments (DA) and the localized assignments (LA) on the forward link and the reverse link. Table 5 shows that when there is no distributed assignment on the forward link, any remaining assignments on any link except the Last Distributed Assignment (LDA) message, if it exists, on the reverse link, can be sent on the first F-SSCH so that any mobile station that is scheduled with the localized assignment on the forward link can confirm that there is no distributed assignment on the forward link and thus, interpreting the demarcation strategy and demarcation line properly. When there is no distributed assignment on the reverse link, any remaining assignments on any link except the Last Distributed Assignment message, if it exists, on the forward link, can be sent on the second F-SSCH.

Table 6 below shows alternative rules of assigning messages to the first F-SSCH and the second F-SSCH under the same scenarios as shown in Table 5. The difference in Table 6 is that when there is no distributed assignment message on one link, the base station gives higher priority to the localized assignment messages on the same link than any remaining assignment messages on the opposite link. The method in Table 6 has benefits. However, as described before, it is always better from the base station power efficiency viewpoint to choose the eligible mobile station with the worst channel condition on the first F-SSCH or the second F-SSCH. The method in Table 5 does increase the pool of eligible mobile stations to choose the worst channel condition from when there is no distributed assignment on one link and thus, may be preferred for a system where the power on the control channels is in great demand.

TABLE 5

| Assignment Scenarios | | | | | |
|---|---|---|---|---|---|
| Forward Link (FL) | | Reverse Link (RL) | | | |
| DA | LA | DA | LA | The 1st F-SSCH | The 2nd F-SSCH |
| | at least 1 | at least 1 | at least 1 | carry the FL LDA message with the 1st scrambling method | carry the RL LDA message with the 1st scrambling method |
| | | | none | carry the FL LDA message with the 1st scrambling method | carry the RL LDA message with the 2nd scrambling method |

TABLE 5-continued

| Assignment Scenarios | | | | | |
|---|---|---|---|---|---|
| Forward Link (FL) | | Reverse Link (RL) | | | |
| DA | LA | DA | LA | The 1st F-SSCH | The 2nd F-SSCH |
| at least 1 | at least 1 | at least 1 | at least 1 | carry the FL LDA message with the 1st scrambling method | carry any remaining assignment message with the 1st scrambling method |
| | | | none | carry the FL LDA message with the 1st scrambling method | carry any remaining assignment message with the 1st scrambling method |
| | | at least 1 | at least 1 | carry the FL LDA message with the 2nd scrambling method | carry the RL LDA message with the 1st scrambling method |
| | | | none | carry the FL LDA message with the 2nd scrambling method | carry the RL LDA message with the 2nd scrambling method |
| | | none | at least 1 | carry the FL LDA message with the 2nd scrambling method | carry any remaining assignment message with the 1st scrambling method |
| | | | none | carry the FL LDA message with the 2nd scrambling method | carry any remaining assignment message with the 1st scrambling method |
| none | | at least 1 | at least 1 | carry any remaining assignment message with the 1st scrambling method | carry the RL LDA message with the 1st scrambling method |
| | | | none | carry any remaining assignment message with the 1st scrambling method | carry the RL LDA message with the 2nd scrambling method |
| | | at least 1 | at least 1 | carry any remaining assignment message with the 1st scrambling method | carry any remaining assignment message with the 1st scrambling method |
| | | | none | carry any remaining assignment message with the 1st scrambling method | carry any remaining assignment message with the 1st scrambling method |
| | | none | at least 1 | carry any remaining assignment message with the 1st scrambling method | carry the RL LDA message with the 1st scrambling method |
| | | | none | carry any remaining assignment message with the 1st scrambling method | carry the RL LDA message with the 2nd scrambling method |
| | | none | at least 1 | carry any remaining assignment message with the 1st scrambling method | carry any remaining assignment message with the 1st scrambling method |
| | | | none | Don't care | Don't care |

TABLE 6

| Assignment Scenarios | | | | | |
|---|---|---|---|---|---|
| Forward Link (FL) | | Reverse Link (RL) | | | |
| DA | LA | DA | LA | The 1st F-SSCH | The 2nd F-SSCH |
| at least 1 | | at least 1 | at least 1 | carry the FL LDA message with the 1st scrambling method | carry the RL LDA message with the 1st scrambling method |
| | | | none | carry the FL LDA message with the 1st scrambling method | carry the RL LDA message with the 2nd scrambling method |
| | | | at least 1 | carry the FL LDA message with | carry a RL localized assignment |

TABLE 6-continued

Assignment Scenarios

| Forward Link (FL) | | Reverse Link (RL) | | | |
|---|---|---|---|---|---|
| DA | LA | DA | LA | The 1st F-SSCH | The 2nd F-SSCH |
| at least 1 | none | | 1 | the 1st scrambling method | message with the 1st scrambling method |
| | | | none | carry the FL LDA message with the 1st scrambling method | carry any remaining assignment message with the 1st scrambling method |
| | none | at least 1 | at least 1 | carry the FL LDA message with the 2nd scrambling method | carry the RL LDA message with the 1st scrambling method |
| | | | none | carry the FL LDA message with the 2nd scrambling method | carry the RL LDA message with the 2nd scrambling method |
| | | none | at least 1 | carry the FL LDA message with the 2nd scrambling method | carry a RL localized assignment message with the 1st scrambling method |
| | | | none | carry the FL LDA message with the 2nd scrambling method | carry any remaining assignment message with the 1st scrambling method |
| none | at least 1 | at least 1 | at least 1 | carry a FL localized assignment message with the 1st scrambling method | carry the RL LDA message with the 1st scrambling method |
| | | | none | carry a FL localized assignment message with the 1st scrambling method | carry the RL LDA message with the 2nd scrambling method |
| | | none | at least 1 | carry a FL localized assignment message with the 1st scrambling method | carry a RL localized assignment message with the 1st scrambling method |
| | | | none | carry a FL localized assignment message with the 1st scrambling method | carry any remaining assignment message with the 1st scrambling method |
| | none | at least 1 | at least 1 | carry any remaining assignment message with the 1st scrambling method | carry the RL LDA message with the 1st scrambling method |
| | | | none | carry any remaining assignment message with the 1st scrambling method | carry the RL LDA message with the 2nd scrambling method |
| | | none | at least 1 | carry any remaining assignment message with the 1st scrambling method | carry a RL localized assignment message with the 1st scrambling method |
| | | | none | Don't care | Don't care |

Novel and improved methods and apparatus to allow the base station to multiplex different types of radio resource assignments in the same data frame have been disclosed in the present invention. There are several advantages of this methodology: The base station has more freedom with the time and frequency resource to multiplex data packets from different users; the base station transmission power on the control channel F-SSCHs is utilized more efficiently with the described methods; and the detection of the assignment messages by the mobile station is more robust.

Another benefit of the present invention is that it is not necessary to have the common pilot tones in the localized assignment zone. Instead, the dedicated pilot tones, which normally are more power-efficient, can be used in the localized assignment zone.

Yet another benefit of the present invention is that the mobile stations that are scheduled with the localized assignment only need to know where the demarcation line is and don't need to know where each distributed assignment occurs, whereas in the prior art, the mobile stations that are scheduled with the localized assignment need to know precisely where each distributed assignment occurs. Therefore, the present invention simplifies the hardware and software implementation at the mobile station receiver.

The various illustrative logical blocks, modules, and circuits described in connection with the embodiment disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

The steps of a method or algorithm described in connection with the embodiments disclosed herein may be implemented or performed directly in hardware, in a software module executed by a processor, or in combination of the two. A software module may reside in RAM memory, flash memory, ROM memory, EPROM memory, EEPROM memory, registers, or any other form of storage medium in the art.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of assigning radio resource in an OFDMA-based wireless communication system to each of a plurality of mobile stations, the method comprising:
    dividing said radio resource into a plurality of assignment units within a frame, each assignment unit being established by either a first type of assignment or a second type of assignment, wherein
    an assignment unit established by said first type of assignment comprises a plurality of subcarriers that are contiguous in both time and frequency, and
    an assignment unit established by said second type of assignment comprises a plurality of subcarriers that are disjoint and are equally-spaced in frequency;
    communicating an assignment for each of a plurality of mobile stations by a base station;
    multiplexing said assignment units within said frame such that assignment units established by said first type of assignment are assigned to be in a first zone of said frame and assignment units established by said second type of assignment are assigned to be in a second zone of said frame; and
    communicating by said base station to each of said mobile stations a demarcation location between the first zone and the second zone.

2. The method in claim 1, wherein said base station chooses the assignment type based on what application information is being transmitted.

3. The method in claim 2, wherein transmission of data is performed by mobile stations assigned by said first type of assignment and Voice-over-Internet Protocol (VOIP) is performed by mobile stations assigned by said second type of assignment.

4. The method in claim 1, wherein said base station chooses the assignment type based on the velocity of said mobile stations.

5. The method in claim 1, wherein said demarcation location is communicated to each of said mobile stations via each of said first type of assignments.

6. The method in claim 1, wherein the base station communicates said demarcation location to each of the mobile stations via an upper layer signaling message.

7. The method in claim 1, wherein the base station communicates said demarcation location to the mobile stations via a common physical layer channel.

8. The method in claim 1, wherein said demarcation location is communicated to each of said mobile stations via a last assignment of the second type of assignment.

9. The method in claim 8, wherein the last assignment of the said second type of assignment is identified by its position in a denotation table.

10. The method in claim 8, wherein the last assignment of the second type of assignment is identified via a first forward shared scheduling channel (F-SSCH).

11. The method in claim 10, wherein the first F-SSCH is identified by a special orthogonal code.

12. The method in claim 10, wherein the first F-SSCH is identified by which of a plurality of scrambling methods was used to scramble the F-SSCH.

13. A system of assigning radio resource in an OFDMA-based wireless communication system to each of a plurality of mobile stations, the system comprising:
    a base station for communicating with a plurality of mobile stations, wherein said base station divides said radio resource into a plurality of assignment units within a frame, each assignment unit being established by either a first type of assignment or a second type of assignment;
    an assignment unit established by said first type of assignment comprises a plurality of subcarriers that are contiguous in both time and frequency;
    an assignment unit established by said second type of assignment comprises a plurality of subcarriers that are disjoint and are equally-spaced in frequency;
    an assignment for each of said plurality of mobile stations is communicated by said base station;
    said base station multiplexes said assignment units within said frame such that assignment units established by said first type of assignment are assigned to be in a first zone of said frame and assignment units established by said second type of assignment are assigned to be in a second zone of said frame; and
    said base station communicates to each of said mobile stations a demarcation location between the first zone and the second zone.

14. The system of claim 13, wherein said base station chooses the assignment type based on what application information is being transmitted.

15. The system of claim 13, wherein said base station chooses the assignment type based on the velocity of said mobile stations.

16. The system of claim 13, wherein said demarcation location is communicated to each of said mobile stations via each of said first type of assignments.

17. The system of claim 13, wherein said demarcation location is communicated to each of said mobile stations via a last assignment of the second type of assignment.

18. The system of claim 17, wherein the last assignment of the second type of assignment is identified via a first forward shared scheduling channel (F-SSCH).

19. A system of assigning radio resource in an OFDMA-based wireless communication system to each of a plurality of mobile stations, the system comprising:
    a mobile station of a plurality of mobile stations for communicating with a base station, wherein
    said base station divides said radio resource into a
        plurality of assignment units within a frame, each assignment unit being established by either a first type of assignment or a second type of assignment;
        an assignment unit established by said first type of assignment comprises a plurality of subcarriers that are contiguous in both time and frequency;
    an assignment unit established by said second type of assignment comprises a plurality of subcarriers that are disjoint and are equally-spaced in frequency;

an assignment for each of said plurality of mobile stations is communicated by said base station;

said base station multiplexes said assignment units within said frame such that assignment units established by said first type of assignment are assigned to be in a first zone of said frame and assignment units established by said second type of assignment are assigned to be in a second zone of said frame; and said base station communicates to each of said mobile stations a demarcation location between the first zone and the second zone.

20. The system of claim 19, wherein said base station chooses the assignment type based on what application information is being transmitted.

21. The system of claim 19, wherein said base station chooses the assignment type based on the velocity of said mobile stations.

22. The system of claim 19, wherein said demarcation location is communicated to each of said mobile stations via each of said first type of assignments.

23. The system of claim 19, wherein said demarcation location is communicated to each of said mobile stations via a last assignment of the second type of assignment.

24. The system of claim 23, wherein the last assignment of the second type of assignment is identified via a first forward shared scheduling channel (F-SSCH).

* * * * *